United States Patent
Iwakura et al.

(10) Patent No.: US 10,628,201 B2
(45) Date of Patent: Apr. 21, 2020

(54) ANALYSIS METHOD AND ANALYSIS APPARATUS

(71) Applicant: FUJITSU LIMITED, Kawasaki-shi, Kanagawa (JP)

(72) Inventors: Hirokazu Iwakura, Adachi (JP); Yuji Nomura, Kawasaki (JP); Naoyoshi Ohkawa, Kawasaki (JP); Yasuhiko Kanemasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 162 days.

(21) Appl. No.: 15/811,984

(22) Filed: Nov. 14, 2017

(65) Prior Publication Data

US 2018/0150313 A1    May 31, 2018

(30) Foreign Application Priority Data

Nov. 25, 2016 (JP) .................................. 2016-228612

(51) Int. Cl.
| | |
|---|---|
| *G06F 9/455* | (2018.01) |
| *H04L 29/08* | (2006.01) |
| *G06F 9/50* | (2006.01) |
| *G06F 12/0831* | (2016.01) |
| *G06F 12/128* | (2016.01) |

(52) U.S. Cl.
CPC ........ *G06F 9/45558* (2013.01); *G06F 9/5027* (2013.01); *G06F 12/0831* (2013.01); *G06F 12/128* (2013.01); *H04L 67/00* (2013.01); *G06F 2009/45583* (2013.01); *G06F 2009/45591* (2013.01); *G06F 2009/45595* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 2012/0304171 A1* | 11/2012 | Joshi | ................... | G06F 9/45558 718/1 |
| 2013/0227566 A1 | 8/2013 | Higuchi et al. | | |
| 2013/0262767 A1* | 10/2013 | Lih | ..................... | G06F 12/0897 711/120 |
| 2013/0329584 A1* | 12/2013 | Ghose | .................. | H04L 45/586 370/252 |
| 2015/0236971 A1* | 8/2015 | Sesha | ...................... | H04L 47/70 709/226 |

(Continued)

FOREIGN PATENT DOCUMENTS

| | | |
|---|---|---|
| JP | 2012-004781 | 1/2012 |
| JP | 2013-175075 | 9/2013 |

(Continued)

*Primary Examiner* — Isaac T Tecklu
(74) *Attorney, Agent, or Firm* — Xsenus LLP

(57) ABSTRACT

A disclosed information processing apparatus includes a memory and a processor. And the processor is coupled to the memory and configured to: detect a first virtual node that is a bottleneck from among plural virtual nodes included in a virtual system; and identify a second virtual node that is a bottleneck based on a first number of cache misses that occurred when a first program for realizing the first virtual node was executed and a second number of cache misses that occurred when a second program for realizing a second virtual node that is other than the first virtual node was executed.

6 Claims, 45 Drawing Sheets

(56) References Cited

U.S. PATENT DOCUMENTS

| | | | |
|---|---|---|---|
| 2015/0244617 A1* | 8/2015 | Nakil | G06F 9/45558 |
| | | | 709/224 |
| 2015/0277959 A1 | 10/2015 | Higuchi et al. | |
| 2016/0127231 A1 | 5/2016 | Sato | |
| 2016/0179560 A1* | 6/2016 | Ganguli | G06F 9/45558 |
| | | | 718/1 |
| 2016/0246717 A1* | 8/2016 | Patil | G06F 12/0806 |

FOREIGN PATENT DOCUMENTS

| | | |
|---|---|---|
| JP | 2015-197715 | 11/2015 |
| JP | 2016-092485 | 5/2016 |

\* cited by examiner

| IP ADDRESS OF FIRST END | IP ADDRESS OF SECOND END | COMMUNICATION DELAY |
|---|---|---|
| 10.1.1.1 | 10.1.1.2 | OCCURRED |
| 10.1.1.1 | 10.1.1.3 | OCCURRED |
| 10.1.1.2 | 10.1.1.3 | NOT OCCURRED |
| 10.1.1.3 | 1.1.1.1 | NOT OCCURRED |
| 1.1.1.1 | 1.1.1.2 | NOT OCCURRED |

FIG.8

| IP ADDRESS OF FIRST END | IP ADDRESS OF SECOND END | COMMUNICATION DELAY |
|---|---|---|
| 10.1.1.1 | 10.1.1.2 | OCCURRED |
| 10.1.1.1 | 10.1.1.3 | OCCURRED |
| 10.1.1.2 | 10.1.1.3 | OCCURRED |
| 10.1.1.3 | 1.1.1.1 | OCCURRED |
| 1.1.1.1 | 1.1.1.2 | NOT OCCURRED |

FIG.10

| IP ADDRESS OF FIRST END | IP ADDRESS OF SECOND END | COMMUNICATION DELAY |
|---|---|---|
| 10.1.1.1 | 10.1.1.2 | NOT OCCURRED |
| 10.1.1.1 | 10.1.1.3 | NOT OCCURRED |
| 10.1.1.2 | 10.1.1.3 | NOT OCCURRED |
| 10.1.1.3 | 1.1.1.1 | OCCURRED |
| 1.1.1.1 | 1.1.1.2 | NOT OCCURRED |

FIG.12

| VIRTUAL MACHINE ID | VIRTUAL SWITCH ID |
|---|---|
| VM1 | VS1 |
| VM2 | VS1 |
| VM3 | VS1 |
| VM4 | VS2 |
| VM5 | VS2 |

FIG.14

| VIRTUAL SWITCH ID | VIRTUAL ROUTER ID |
|---|---|
| VS1 | VR1 |
| VS2 | VR1 |

FIG.15

| CONNECTION ID | SOURCE IP ADDRESS | SOURCE PORT NUMBER | DESTINATION IP ADDRESS | DESTINATION PORT NUMBER |
|---|---|---|---|---|
| 1 | 10.1.1.1 | 10000 | 10.1.1.2 | 80 |
| 2 | 10.1.1.1 | 20000 | 10.1.1.3 | 8002 |
| 3 | 10.1.1.2 | 30000 | 10.1.1.3 | 8080 |
| ⋮ | ⋮ | ⋮ | ⋮ | ⋮ |

FIG.16

| PACKET ID | CONNECTION ID | DIRECTION | TCP TYPE | SEQUENCE NUMBER | L7 TYPE | ACQUISITION TIME |
|---|---|---|---|---|---|---|
| 1 | 1 | UPWARD | DATA TRANSFER | 1 | - | t1 |
| 2 | 2 | UPWARD | - | - | REQUEST | t2 |
| ... | ... | ... | ... | ... | ... | ... |
| 10 | 1 | DOWNWARD | ASK | 1 | - | t10 |
| ... | ... | ... | ... | ... | ... | ... |
| 20 | 2 | DOWNWARD | - | - | RESPONSE | t20 |
| ... | ... | ... | ... | ... | ... | ... |

FIG.17

| IP ADDRESS OF FIRST END | IP ADDRESS OF SECOND END | COMMUNICATION DELAY |
|---|---|---|
| 10.1.1.1 | 10.1.1.2 | NOT OCCURRED |
| 10.1.1.1 | 10.1.1.3 | OCCURRED |
| 10.1.1.2 | 10.1.1.3 | OCCURRED |
| 10.1.1.3 | 1.1.1.1 | OCCURRED |
| 1.1.1.1 | 1.1.1.2 | NOT OCCURRED |

FIG.28

| IP ADDRESS OF FIRST END | IP ADDRESS OF SECOND END | COMMUNICATION DELAY |
|---|---|---|
| 10.1.1.1 | 10.1.1.2 | OCCURRED |
| 10.1.1.1 | 10.1.1.3 | OCCURRED |
| 10.1.1.2 | 10.1.1.3 | OCCURRED |
| 10.1.1.3 | 1.1.1.1 | OCCURRED |
| 1.1.1.1 | 1.1.1.2 | NOT OCCURRED |

FIG.30

| NUMBER OF CACHE MISSES | NUMBER OF INCREMENTAL CACHE MISSES | ACQUISITION TIME |
|---|---|---|
| ⋮ | ⋮ | ⋮ |
| M101 | I101 | t101 |
| M102 | I102 | t102 |
| M103 | I103 | t103 |

ANALYSIS METHOD AND ANALYSIS APPARATUS

CROSS-REFERENCE TO RELATED APPLICATIONS

This application is based upon and claims the benefit of priority of the prior Japanese Patent Application No. 2016-228612, filed on Nov. 25, 2016, the entire contents of which are incorporated herein by reference.

FIELD

This invention relates to a technique for analyzing a condition of a virtualization system.

BACKGROUND

When a computer that has plural CPUs (Central Processing Unit) realizes a virtualization system including plural virtual nodes, one of the CPUs is allocated to each virtual node. Then, by executing a program by the allocated CPU, the virtual node is realized. In addition, communication between virtual nodes is performed by a mechanism of an internal virtual network.

Also in such a virtualization system, there is a case where communication efficiency decreases due to a virtual node that is a bottleneck. However, unlike in the case of a physical network, it is impossible to identify the bottleneck by monitoring transmission rates.

Moreover, in the virtualization system, there is a case where plural virtual nodes become bottlenecks simultaneously. In other words, there is no technique to make it easy to find bottlenecks that occurred simultaneously.

Patent Document 1: Japanese Laid-open Patent Publication No. 2012-4781
Patent Document 2: Japanese Laid-open Patent Publication No. 2015-197715
Patent Document 3: Japanese Laid-open Patent Publication No. 2013-175075
Patent Document 4: Japanese Laid-open Patent Publication No. 2016-92485

SUMMARY

An information processing apparatus relating to one aspect includes a memory and a processor. And the processor is coupled to the memory and configured to: detect a first virtual node that is a bottleneck from among plural virtual nodes included in a virtual system; and identify a second virtual node that is a bottleneck based on a first number of cache misses that occurred when a first program for realizing the first virtual node was executed and a second number of cache misses that occurred when a second program for realizing a second virtual node that is other than the first virtual node was executed.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a diagram depicting a communication delay table in the first aspect of a bottleneck;

FIG. 10 is a diagram depicting the communication delay table in the second aspect of a bottleneck;

FIG. 12 is a diagram depicting the communication delay table in the third aspect of a bottleneck;

FIG. 14 is a diagram depicting an example of a subnetwork table;

FIG. 15 is a diagram depicting an example of a network connection table;

FIG. 16 is a diagram depicting an example of a connection table;

FIG. 17 is a diagram depicting an example of a log table;

FIG. 28 is a diagram depicting the communication delay table in the fourth aspect of a bottleneck;

FIG. 30 is a diagram depicting the communication delay table in the fifth aspect of a bottleneck;

DESCRIPTION OF EMBODIMENTS

[Embodiment 1]

Figure 1:
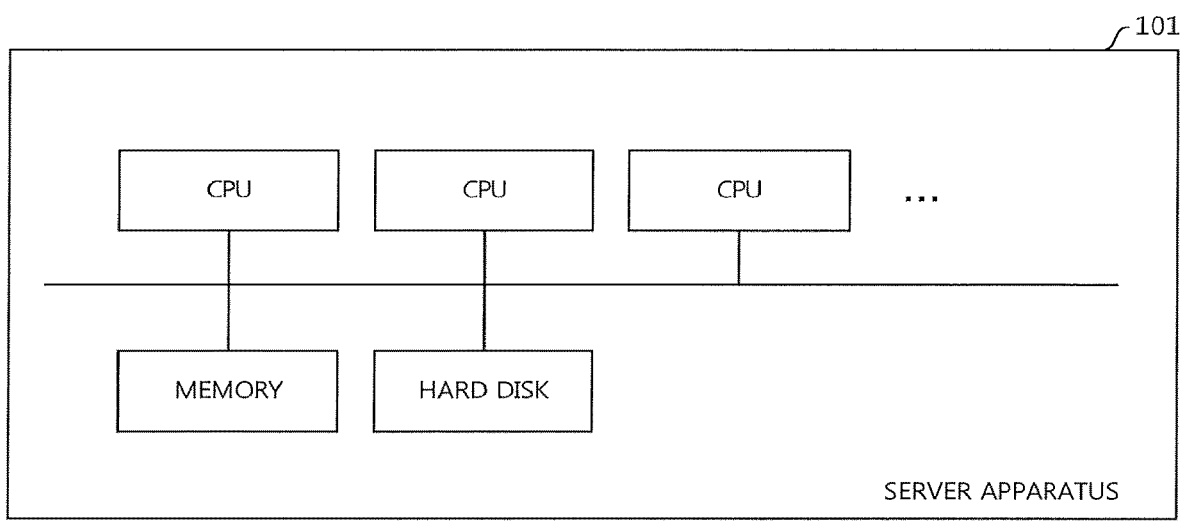
FIG. 1 is a diagram depicting an example of resources of a server apparatus.

A virtualization system in embodiments will be explained with reference to FIGS. 1 and 2. As illustrated in FIG. 1, a server apparatus 101 on which the virtualization system operates has resources such as plural CPUs, a memory and a hard disk.

Figure 2:
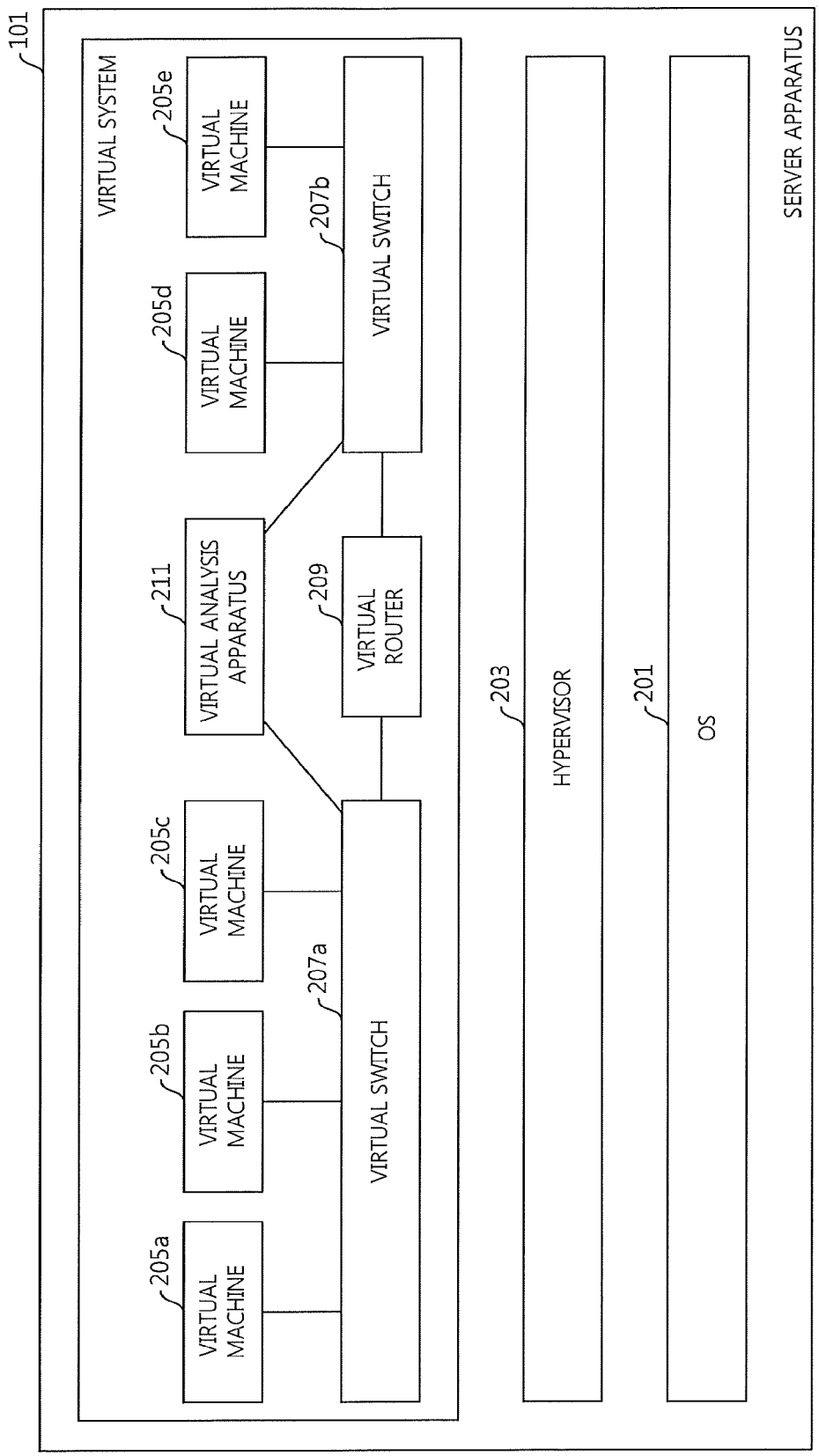
FIG. 2 is a diagram depicting an example of a module configuration of the server apparatus.

A hypervisor 203 in FIG. 2 uses these resources to provide a virtualization environment. Virtual machines 205a to 205e, virtual switches 207a and 207b, and a virtual router 209 included in the virtualization system are realized by executing a program in the virtualization environment that the hypervisor 203 controls. One or plural CPUs are allocated to the virtual machines 205, the virtual switches 207, and the virtual router 209. Hereinafter, the virtual machines 205, the virtual switches 207, and the virtual router 209 may be referred to as virtual nodes.

The virtual machines 205 communicate with each other via a virtual network. The virtual network is realized by the virtual switches 207 and the virtual router 209 which perform relaying between the virtual machines 205.

For example, in the case of a system in which physical machines are connected by a physical network, a bottleneck is caused by bandwidth in a communication path between the nodes. Therefore, occurrence of a bottleneck is detected by monitoring a transmission rate in each communication path. On the other hand, in the case of the virtualization system, since data transmission is performed virtually, there is no fixed restriction such as bandwidth in the physical network. However, there is a case where increase of a load of a CPU delays virtual data transmission. In the embodiments, occurrence of a bottleneck in a virtual system is grasped by analyzing communication packets (hereinafter, referred to as packets).

The virtual analysis apparatus 211 uses a mirroring function of the virtual switch 207 to capture packets transmitted between the virtual machines 205. Then, the virtual analysis apparatus 211 checks a network quality of the virtual network based on the captured packets.

Specifically, the virtual analysis apparatus 211 analyzes the captured packets and determines whether or not a communication delay has occurred between the virtual nodes. Then, the virtual analysis apparatus 211 detects occurrence of a bottleneck based on the determination result, and identifies a virtual node that is a bottleneck. When a virtual node that is a bottleneck is identified, it is possible to eliminate the bottleneck by additionally allocating a CPU which has an available capacity to the virtual node. The virtual analysis apparatus 211 is also realized by executing a program in a virtual environment that the hypervisor 203 controls.

Figure 3:
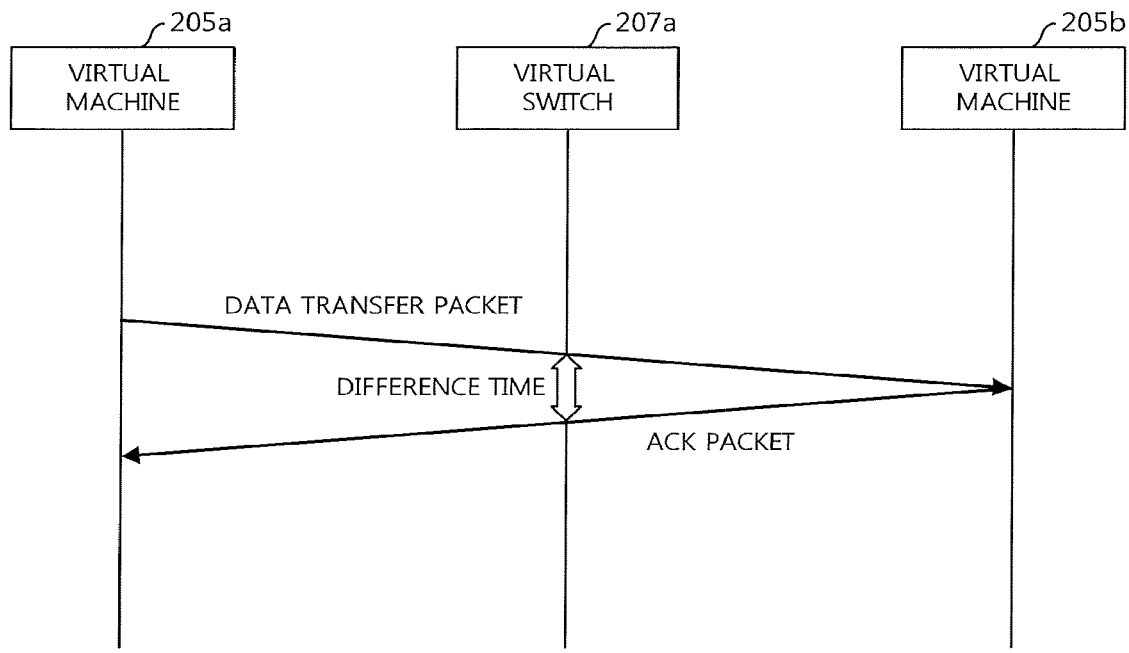
FIG. 3 is a diagram depicting an overview of a first determination method to detect occurrence of a communication delay.

Hereinafter, three examples of determination methods for detecting a communication delay between the virtual machines 205 are described. FIG. 3 illustrates an overview of a first determination method for detecting occurrence of a communication delay. The first determination method uses RTT (Round-Trip Time). Namely, according to the first determination method, a capture time of TCP (Transmission Control Protocol) data transfer packet in the virtual switch 207 and a capture time of an acknowledgment signal packet (hereinafter, referred to as ACK packet) with respect to this data transfer packet are obtained, a difference between these times is calculated. When the difference time exceeds a threshold, it is determined that a communication delay has occurred. When the difference time does not exceed the threshold, it is determined that a communication delay has not occurred.

Figure 4:
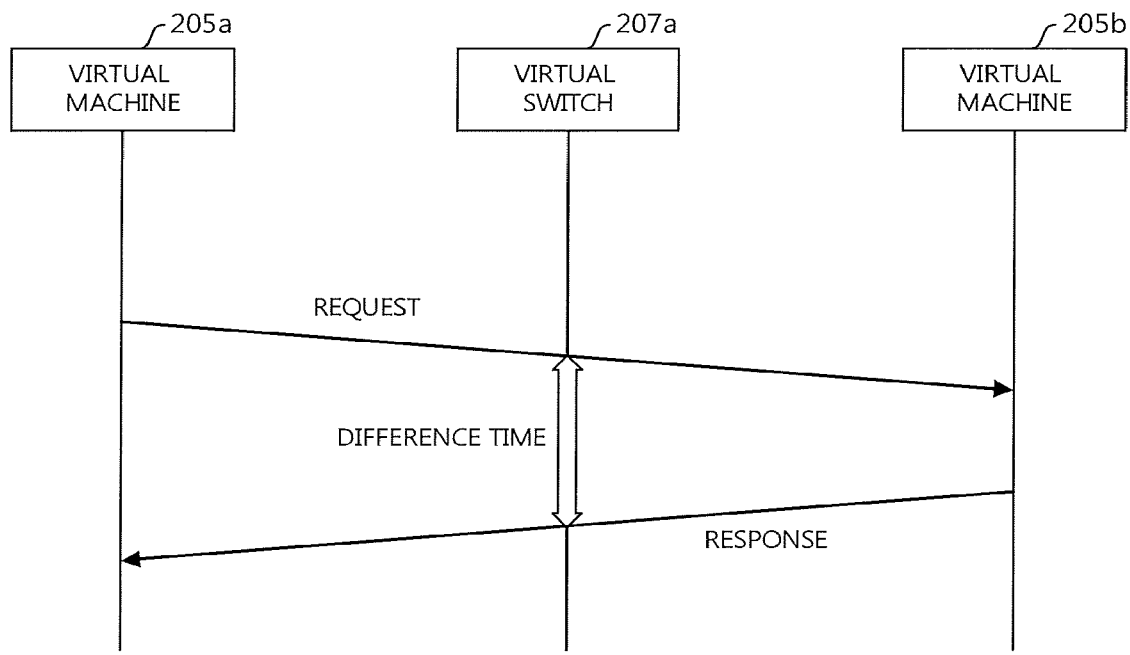
FIG. 4 is a diagram depicting an overview of a second determination method to detect occurrence of a communication delay.

FIG. 4 illustrates an overview of a second determination method for detecting occurrence of a communication delay. The second determination method is based on an assumption that communication is performed by a request message and a response message in L7 (an application layer of the OSI (Open Systems Interconnection) reference model). In the second determination method, a capture time of the request message and a capture time of the response message to this request message are obtained, and a difference between these times (response time) is calculated. When the difference time exceeds the threshold, it is determined that a communication delay has occurred. When the difference time does not exceed the threshold, it is determined that a communication delay has not occurred.

Figure 5:
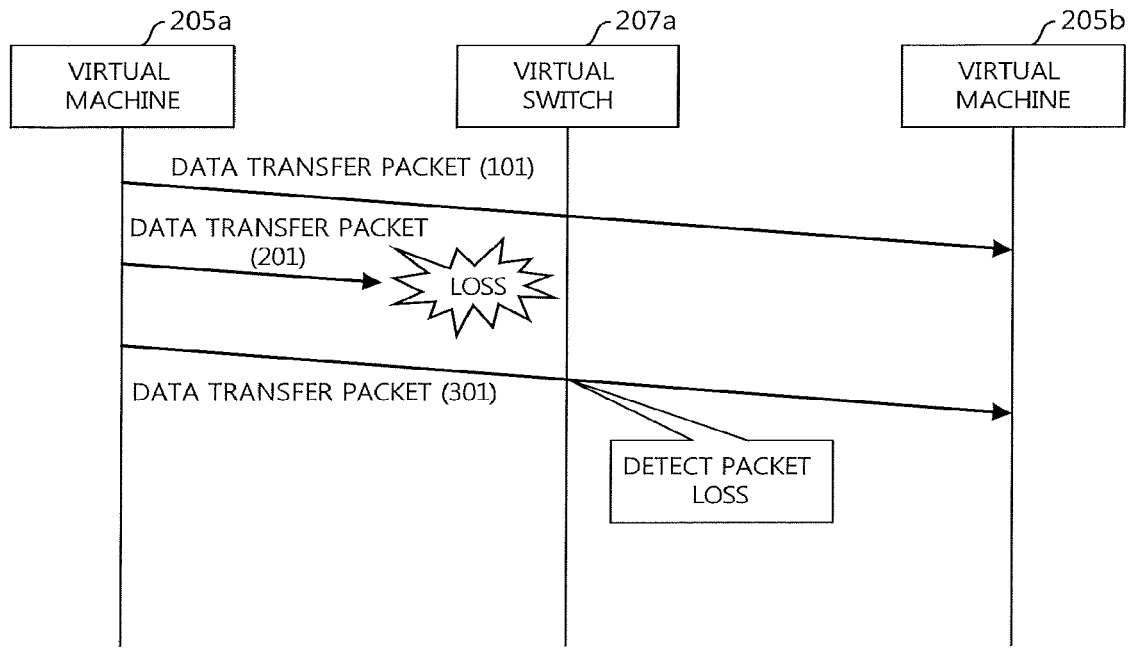
FIG. 5 is a diagram depicting an overview of a third determination method to detect occurrence of a communication delay.
Figure 6:
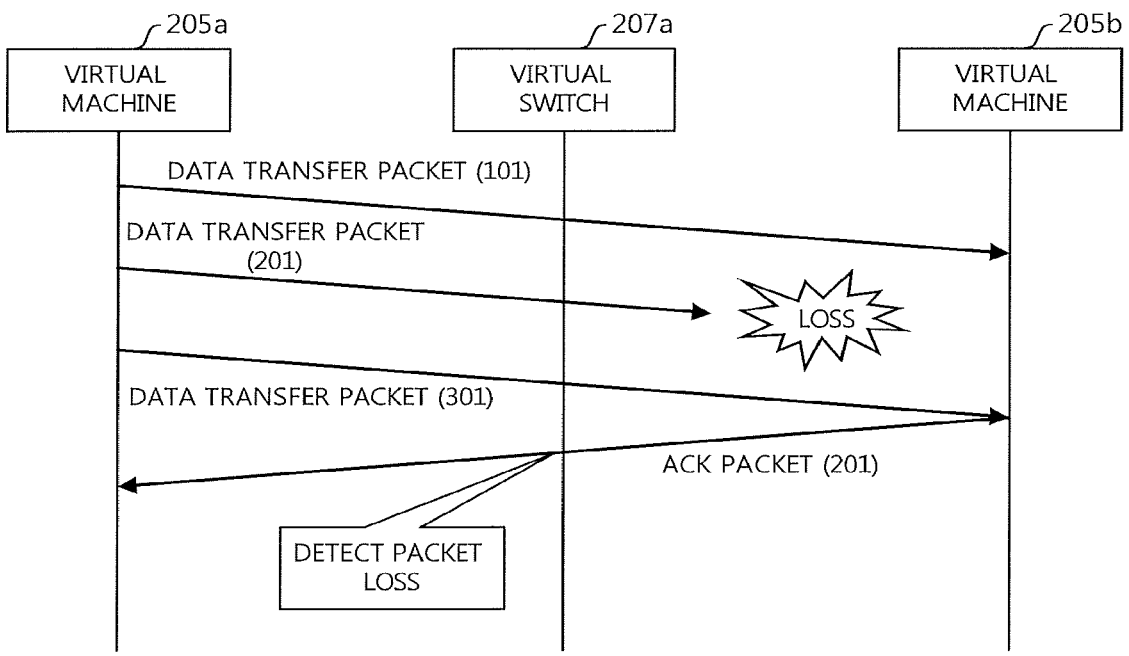
FIG. 6 is a diagram depicting an overview of a third determination method to detect occurrence of a communication delay.

FIG. 5 and FIG. 6 illustrate an overview of a third determination method for detecting occurrence of a communication delay. The third determination method detects a communication delay based on packet loss. The packet loss is found, for example, by checking consecutiveness of TCP packets. As illustrated in FIG. 5, when there is no consecutiveness in sequence numbers of data transfer packets in the same connection, it is determined that a data transfer packet has been lost before reaching the virtual switch 207. Moreover, as illustrated in FIG. 6, when a sequence number of an ACK packet does not correspond to a response to the captured latest data transfer packet in the opposite direction, it is determined that the data transfer packet has been lost after being relayed by the virtual switch 207. When a data transfer packet is lost, it is assumed that a communication delay has occurred.

Figure 7:
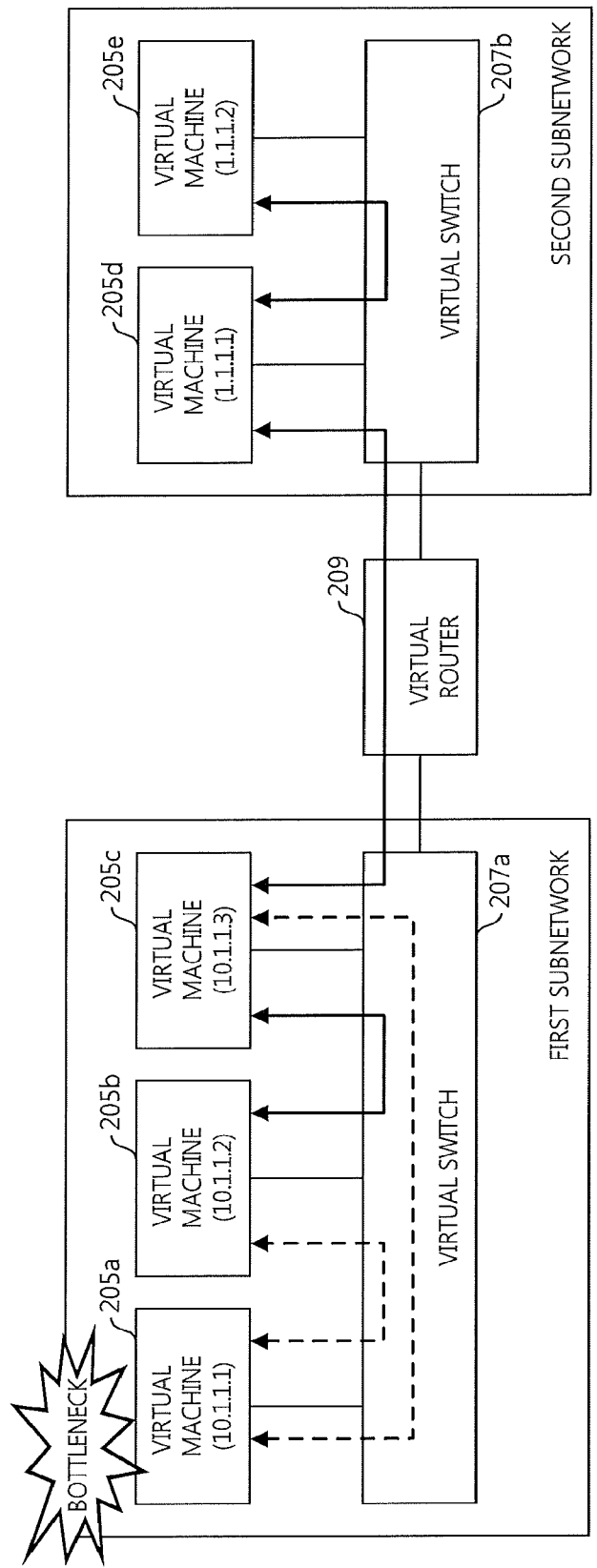
FIG. 7 is a diagram depicting a first aspect of a bottleneck.

Next, an aspect of a bottleneck in the virtualization system will be explained. FIG. 7 illustrates a first aspect of a bottleneck. In the first aspect, the virtual machine 205 is a bottleneck. In this example, it is assumed that the virtual machine 205a (IP address: 10.1.1.1) is a bottleneck. A delay occurs in a virtual communication path where the virtual machine 205a, which is the bottleneck, is a transmission source (hereinafter, referred to as a source) or a destination (hereinafter, referred to as a destination). In this example, a delay occurs in a virtual communication path (hereinafter, referred to as a first communication path) between the virtual machine 205a and the virtual machine 205b (IP address: 10.1.1.2). Hereinafter, a virtual communication path where a delay occurs is represented by a broken line. In addition, a delay occurs also in a virtual communication path between the virtual machine 205a and the virtual machine 205c (IP address: 10.1.1.3) (hereinafter referred to as second communication path).

On the other hand, no delay occurs in a virtual communication path between the virtual machine 205b and the virtual machine 205c (hereinafter referred to as the third communication path). Hereinafter, a virtual communication path in which no delay occurs will be represented by a solid line. Besides, no delay occurs in the virtual communication path between the virtual machine 205c and the virtual machine 205d (IP address: 1.1.1.1) (hereinafter referred to as a fourth communication path). Moreover, no delay occurs in the virtual communication path between the virtual machine 205d and the virtual machine 205e (IP address: 1.1.1.2) (hereinafter referred to as a fifth communication path).

A group of the virtual switch 207 and the virtual machines 205 connected to that virtual switch 207 is referred to as a subnetwork. In this example, a group of the virtual switch 207a and the virtual machines 205a to 205c connected to the virtual switch 207a is referred to as a first subnetwork. Moreover, a group of the virtual switch 207b and the virtual machines 205d and 205e connected to the virtual switch 207b is referred to as a second subnetwork.

The virtual analysis apparatus 211 manages a condition relating to communication delays using a communication delay table. FIG. 8 illustrates the communication delay table in the first aspect of a bottleneck. The communication delay table in this example has a record (hereinafter referred to as combination record) corresponding to a combination of the virtual machines 205 that correspond to the source and the destination. The combination record has a field in which an IP address of a first end is stored, a field in which an IP address of a second end is stored, and a field in which a condition relating to the communication delay is set.

The IP address of the first end is an IP address of the virtual machine 205 that corresponds to one end of a virtual communication path. The IP address of the second end is an IP address of the virtual machine 205 corresponding to the other end of the virtual communication path. The condition relating to the communication delay is either "occurred" or "not occurred".

The illustrated first combination record corresponds to a combination of the virtual machine 205a and the virtual machine 205b and corresponds to the first communication path. The illustrated second combination record corresponds to a combination of the virtual machine 205a and the virtual machine 205c and corresponds to the second communication path. The illustrated third combination record corresponds to a combination of the virtual machine 205b and the virtual machine 205c and corresponds to the third communication path. The illustrated fourth combination record corresponds to a combination of the virtual machine 205c and the virtual machine 205d and corresponds to the fourth communication path. The illustrated fifth combination record corresponds to a combination of the virtual machine 205d and the virtual machine 205e and corresponds to the fifth communication path.

When the virtual machine 205a is a bottleneck, the condition relating to the communication delay in the first and second combination records is "occurred". On the other hand, the condition relating to the communication delay in the third to fifth combination records is "not occurred".

Figure 9:
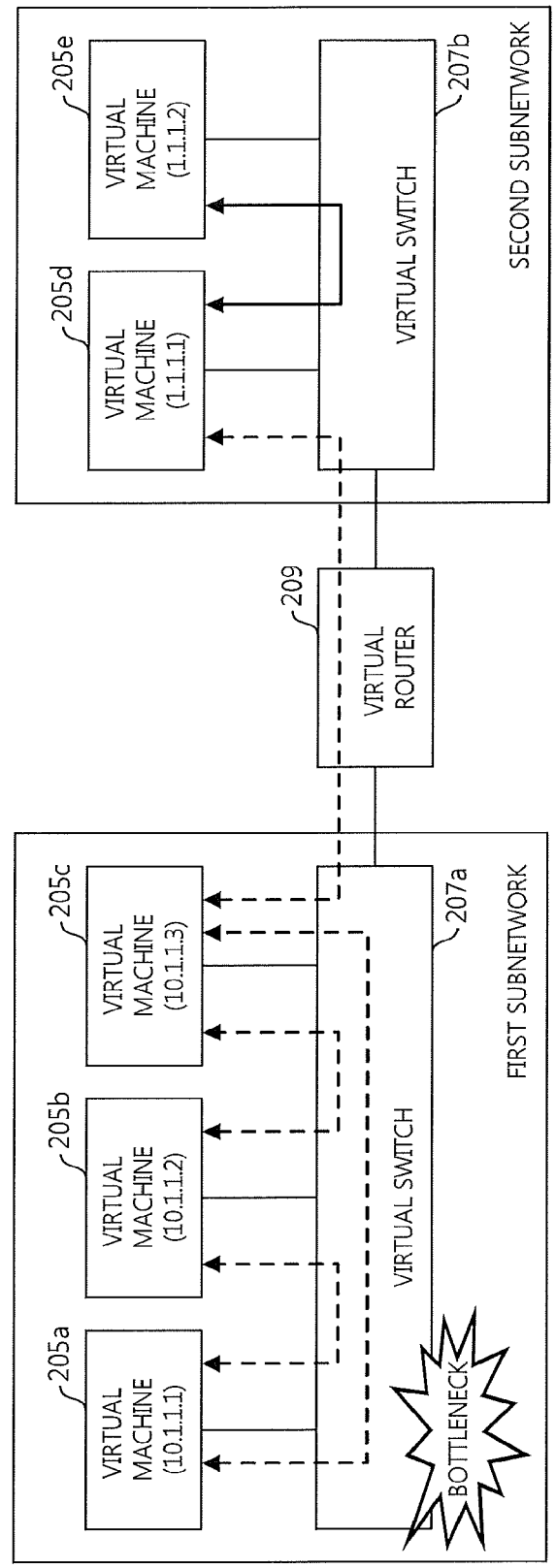
FIG. 9 is a diagram depicting a second aspect of a bottleneck.

FIG. 9 illustrates a second aspect of the bottleneck. In the second aspect, the virtual switch 207 is a bottleneck. In this example, it is assumed that the virtual switch 207a is a bottleneck. A delay occurs in a virtual communication path in which the virtual switch 207a that is a bottleneck relays. In this example, a delay occurs in the first communication path to the fourth communication path. On the other hand, in a communication that the virtual switch 207a that is a bottleneck does not relay, no delay occurs. In this example, no delay occurs in the fifth communication path.

FIG. 10 illustrates the communication delay table in the second aspect of a bottleneck. When the virtual switch 207a is a bottleneck, the condition relating to the communication delay in the first to fourth combination records is "occurred". On the other hand, the condition relating to the communication delay in the fifth combination record is "not occurred".

Figure 11:
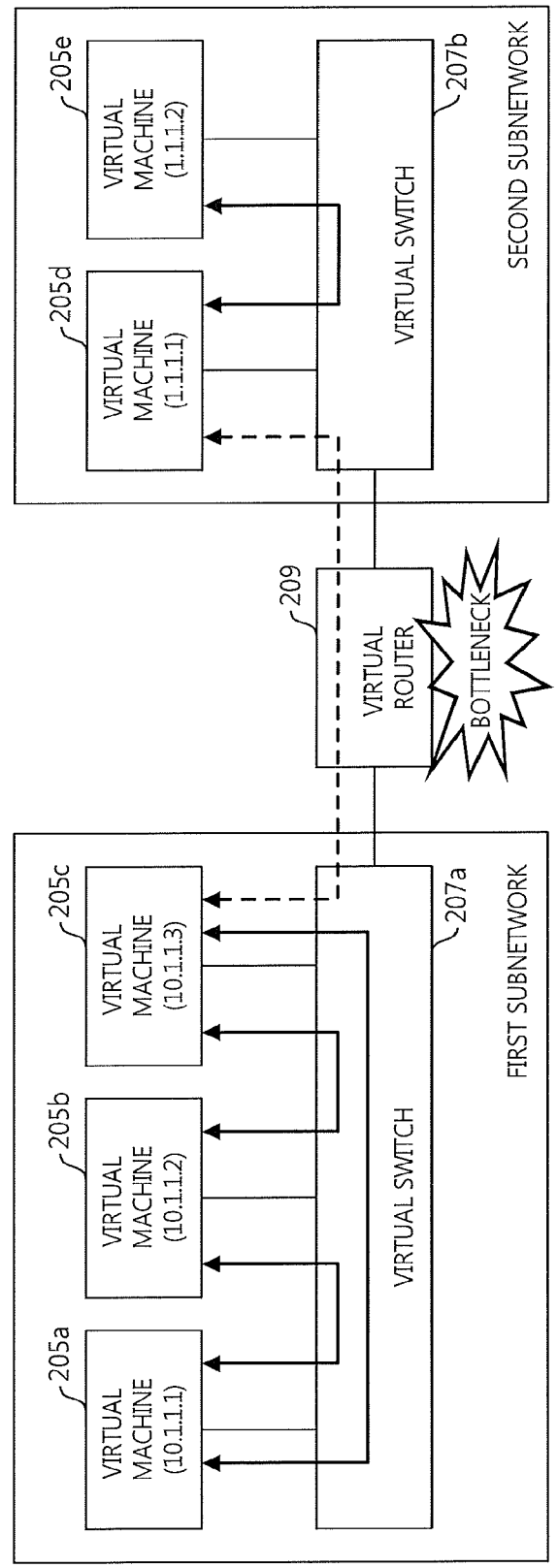
FIG. 11 is a diagram depicting a third aspect of a bottleneck.

FIG. 11 illustrates a third aspect of a bottleneck. In the third aspect, the virtual router 209 is a bottleneck. A delay occurs in a virtual communication path in which the virtual router 209 that is a bottleneck relays. In this example, a delay occurs in the fourth communication path. On the other hand, no delay occurs in a communication in which the virtual router 209 that is a bottleneck does not relay. In this example, there is no delay in the first communication path to the third communication path, and the fifth communication path.

FIG. 12 illustrates the communication delay table in the third aspect of a bottleneck. When the virtual router 209 is a bottleneck, the condition relating to a communication delay in the fourth combination record is "occurred". On the other hand, the condition relating to a communication delay in the first to third and fifth combination records is "not occurred".

First, an analysis example that is a basis of the embodiments will be explained. In this analysis example, the first to third aspects of a bottleneck described above are assumed.

Figure 13:
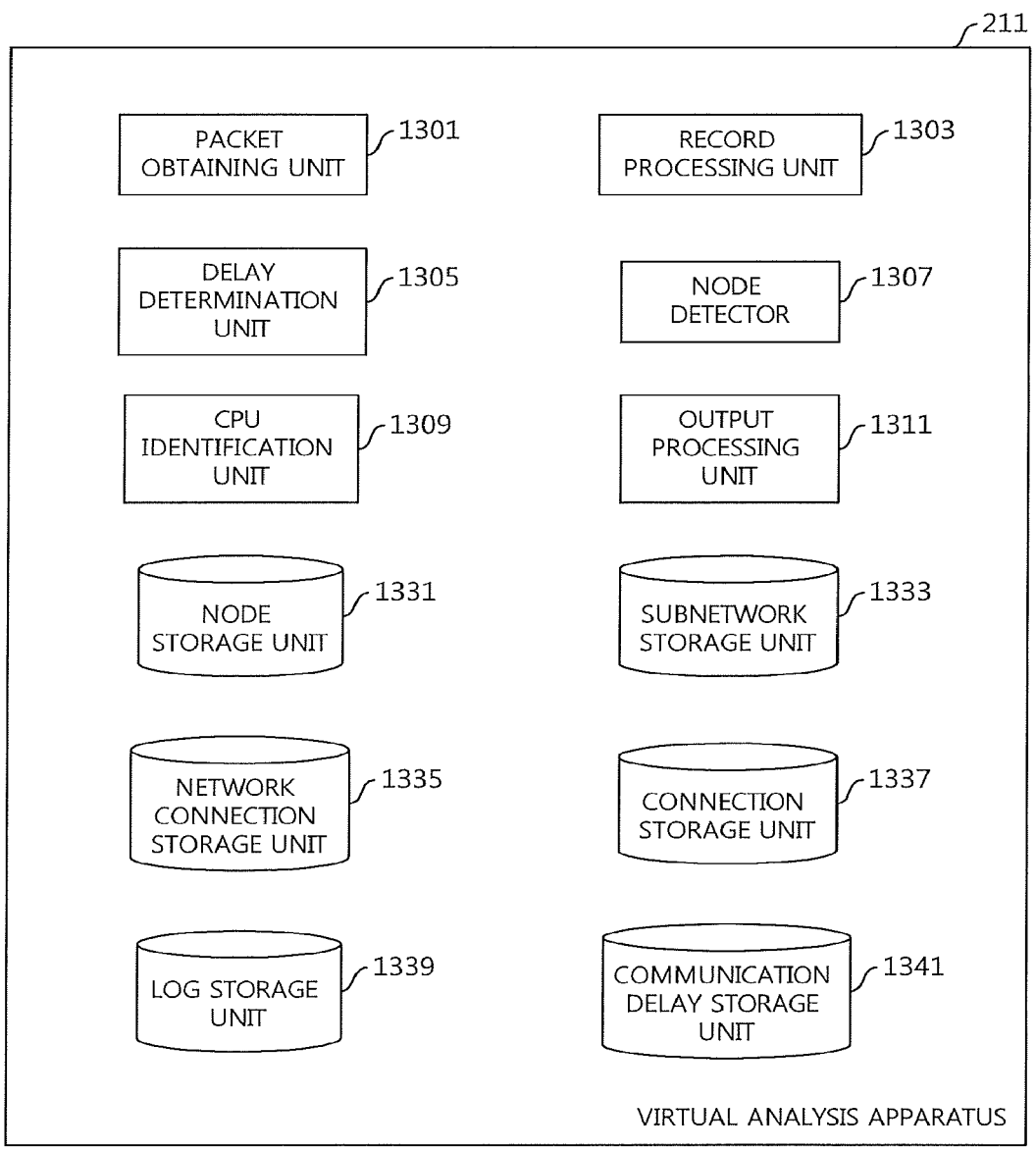
FIG. 13 is a diagram depicting an example of a module configuration of a virtual analysis apparatus in a basic example.

FIG. 13 illustrates an example of a module configuration of the virtual analysis apparatus 211, which is a basis of the embodiments. The virtual analysis apparatus 211 includes a packet obtaining unit 1301, a record processing unit 1303, a delay determination unit 1305, a node detector 1307, a CPU identification unit 1309, an output processing unit 1311, a node storage unit 1331, a subnetwork storage unit 1333, a network connection storage unit 1335, a connection storage unit 1337, a log storage unit 1339, and a communication delay storage unit 1341.

The packet obtaining unit 1301 obtains a packet transferred by the virtual switch 207. The record processing unit 1303 performs processing to record a log. The delay determination unit 1305 determines occurrence of a communication delay. The node detector 1307 detects a virtual node which is a bottleneck. The CPU identification unit 1309 identifies the CPU number allocated to the virtual node of the bottleneck. The output processing unit 1311 performs a process of outputting a virtual node that is a bottleneck and CPU number.

The node storage unit 1331 stores a node table. The node table has a record for each virtual node, and a virtual node ID, a virtual node name, and an IP address are set in the record. The node table is not illustrated.

The subnetwork storage unit 1333 stores a subnetwork table. The subnetwork table will be described later with reference to FIG. 14. A network connection storage unit 1335 stores a network connection table. The network connection table will be described later with reference to FIG. 15. The connection storage unit 1337 stores a connection table. The connection table will be described later with reference to FIG. 16. The log storage unit 1339 stores a log table. The log table will be described later with reference to FIG. 17. The communication delay storage unit 1341 stores the communication delay table described above.

The aforementioned packet obtaining unit 1301, record processing unit 1303, delay determination unit 1305, node detector 1307, CPU identification unit 1309, and output processing unit 1311 are realized by hardware resources (for example, FIG. 50) and a program that causes a processor to execute the following processing.

Figure 50:
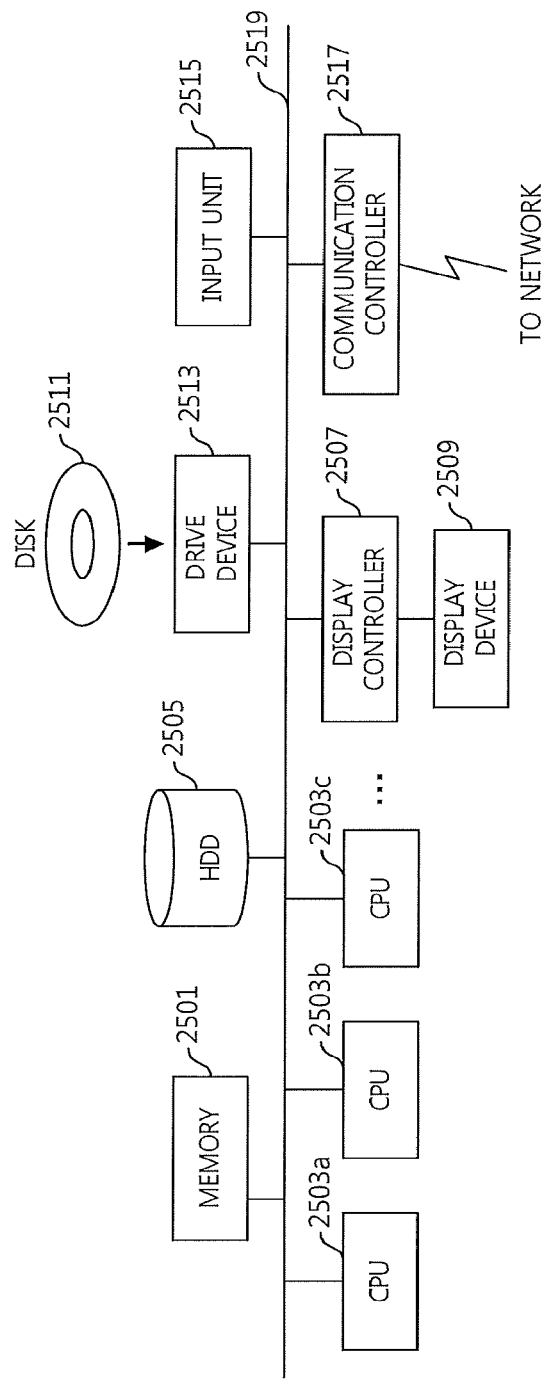
FIG. 50 is a functional block diagram of a computer.

The aforementioned node storage unit 1331, subnetwork storage unit 1333, network connection storage unit 1335, connection storage unit 1337, log storage unit 1339, and communication delay storage unit 1341 are realized by hardware resources (for example, FIG. 50).

FIG. 14 illustrates an example of the subnetwork table. The subnetwork table in this example has a record that to the virtual machines 205. A record of the subnetwork table has a field for storing a virtual machine ID and a field for storing a virtual switch ID.

The virtual switch ID identifies a virtual switch 207 connected to a virtual machine 205 identified by the virtual machine ID. For example, the illustrated first record represents that the virtual machine 205*a* identified by ID: VM1 is connected to the virtual switch 207*a* identified by the ID: VS1. The subnetwork table is used, for example, to determine which subnetwork the virtual machine 205 belongs to. Instead of the virtual machine ID, an IP address of the virtual machine 205 may be used. Moreover, instead of the virtual switch ID, an IP address of the virtual switch 207 may be used.

FIG. 15 illustrates an example of the network connection table. The network connection table in this example has a record that corresponds to the virtual switches 207. A record of the network connection table has a field in which a virtual switch ID is stored and a field in which a virtual router ID is stored.

The virtual router ID identifies the virtual router 209 to which the virtual switch 207 identified by the virtual switch ID is connected. Instead of the virtual switch ID, an IP address of the virtual switch 207 may be used. Instead of the virtual router ID, an IP address of the virtual router 209 may be used.

The illustrated first record represents that the virtual switch 207*a* identified by ID: VS1 is connected to the virtual router 209 identified by ID: VR1. The network connection table is used, for example, to determine which virtual router 209 a subnetwork specified by a certain virtual switch 207 is connected with.

FIG. 16 illustrates an example of the connection table. A connection table in this example has a record (hereinafter, referred to as a connection record) that corresponds to a connection between the virtual machines 205. The connection record includes a field in which a connection ID is set, a field in which a source IP address is stored, a field in which a source port number is stored, a field in which a destination IP address is stored, and a field in which a destination port number is stored.

The connection ID identifies a connection. The source IP address is an IP address of the virtual machine 205 that requested the connection. The source port number is a port number allocated to a program that requested the connection. The destination IP address is an IP address of the virtual machine 205 to which the connection was requested. The destination port number is a port number allocated to a program to which the connection was requested.

FIG. 17 illustrates an example of the log table. The log table in this example has a record (hereinafter, referred to as a log record) that corresponds to the obtained packet. The log record includes a field in which a packet ID is set, a field in which a connection ID is stored, a field in which a direction is stored, a field in which a TCP type is stored, a field in which a sequence number is stored, a field in which a L7 type is stored, and a field in which an acquisition time is stored.

The packet ID identifies an obtained packet. The connection ID identifies a connection in which the packet is transmitted. The direction represents a direction in which the packet is transmitted. The direction of the packet transmitted from the virtual machine 205 that has the source IP address in the connection record to the virtual machine 205 that has the destination IP address is upward. On the other hand, the direction of the packet transmitted from the virtual machine 205 that has the destination IP address in the connection record to the virtual machine 205 that has the source IP address is downward. The TCP type identifies a data transfer packet and an ACK packet. The sequence number is included in a data transfer packet and an ACK packet. The L7 type identifies a request message and a response message. The acquisition time is a time at which the packet was obtained. A date information may be added to the acquisition time.

Figure 18:
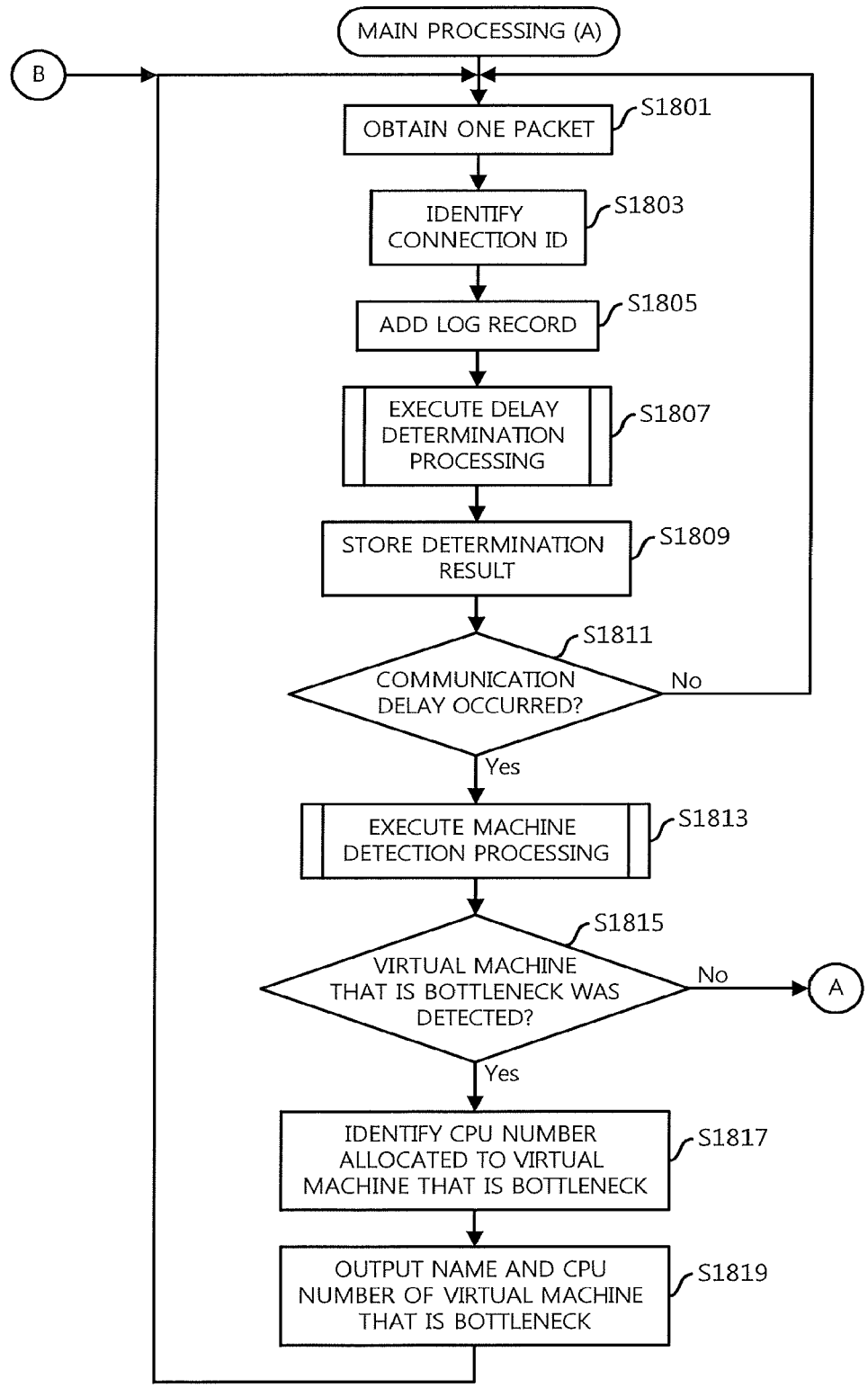
FIG. 18 is a diagram depicting a flow for main processing (A)

Next, processing in the virtual analysis apparatus 211 will be explained. In the embodiments, the virtual analysis apparatus 211 executes main processing (A). FIG. 18 illustrates a main processing (A) flow.

The packet obtaining unit 1301 obtains one packet from one of the virtual switches 207 (S1801).

The record processing unit 1303 extracts connection data (a source IP address, a source port number, a destination IP address and a destination port number) from header information of the obtained packet and identifies a connection ID (S1803). When there is a connection record that coincides with the connection data, the record processing unit 1303 identifies a connection ID of the connection record. When it is determined that a new connection has been established, the record processing unit 1303 adds a new connection record and identifies a new connection ID in the connection record. Then, the record processing unit 1303 adds a log record based on the obtained packet (S1805). Contents of the log record are as described above.

The delay determination unit 1305 executes delay determination processing (S1807). In the delay determination processing, the delay determination unit 1305 determines whether or not a communication delay is occurring based on the packet obtained in S1801 of FIG. 18.

Figure 19:
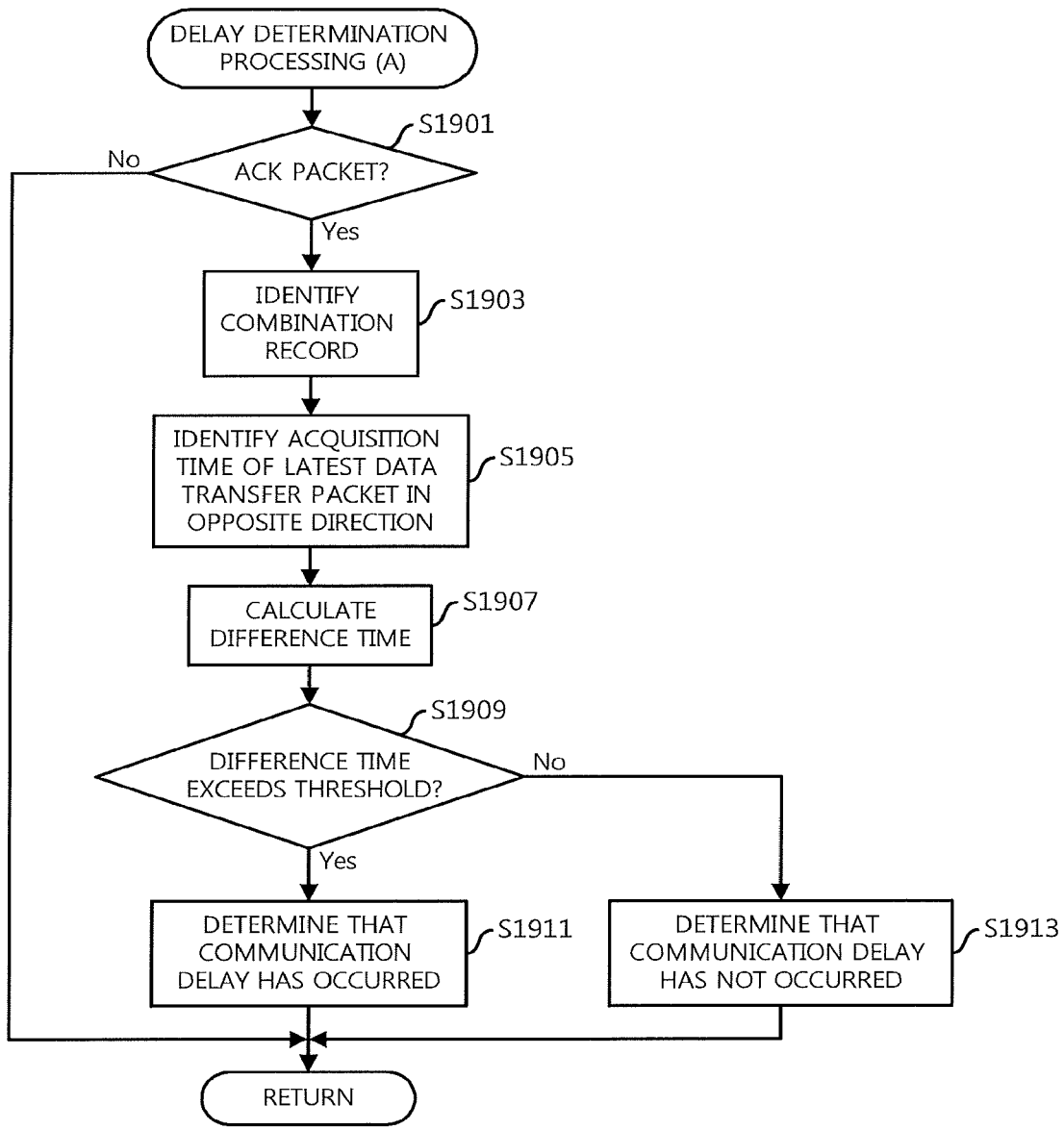
FIG. 19 is a diagram depicting a flow for delay determination processing (A)

Three examples of the delay determination processing will be described. The delay determination processing (A)

corresponds to the first determination method illustrated in FIG. 3. FIG. 19 illustrates a flow for the delay determination processing W.

The delay determination unit 1305 determines whether or not the packet obtained in S1801 of FIG. 18 is an ACK packet (S1901). When it is determined that the obtained packet is not an ACK packet, the delay determination processing ends. In other words, the condition relating to the communication delay does not change.

On the other hand, when it is determined that the obtained packet is an ACK packet, the delay determination unit 1305 identifies a combination record corresponding to the source and the destination of the obtained packet in the communication delay table (S1903).

Based on the log table, the delay determination unit 1305 identifies an acquisition time of the latest data transfer packet among packets in a direction opposite to a direction of the obtained packet (S1905). The delay determination unit 1305 calculates a difference time by subtracting the acquisition time of the latest data transfer packet in the opposite direction from the acquisition time of the packet obtained in S1801 of FIG. 18, that is, the acquisition time of this time (S1907). Then, the delay determination unit 1305 determines whether or not the difference time exceeds a threshold (S1909).

When it is determined that the difference time exceeds the threshold, the delay determination unit 1305 determines that a communication delay has occurred (S1911). On the other hand, when it is determined that the difference time does not exceed the threshold, the delay determination unit 1305 determines that a communication delay has not occurred (S1913). Then, the processing returns to the calling-source processing.

Figure 20:
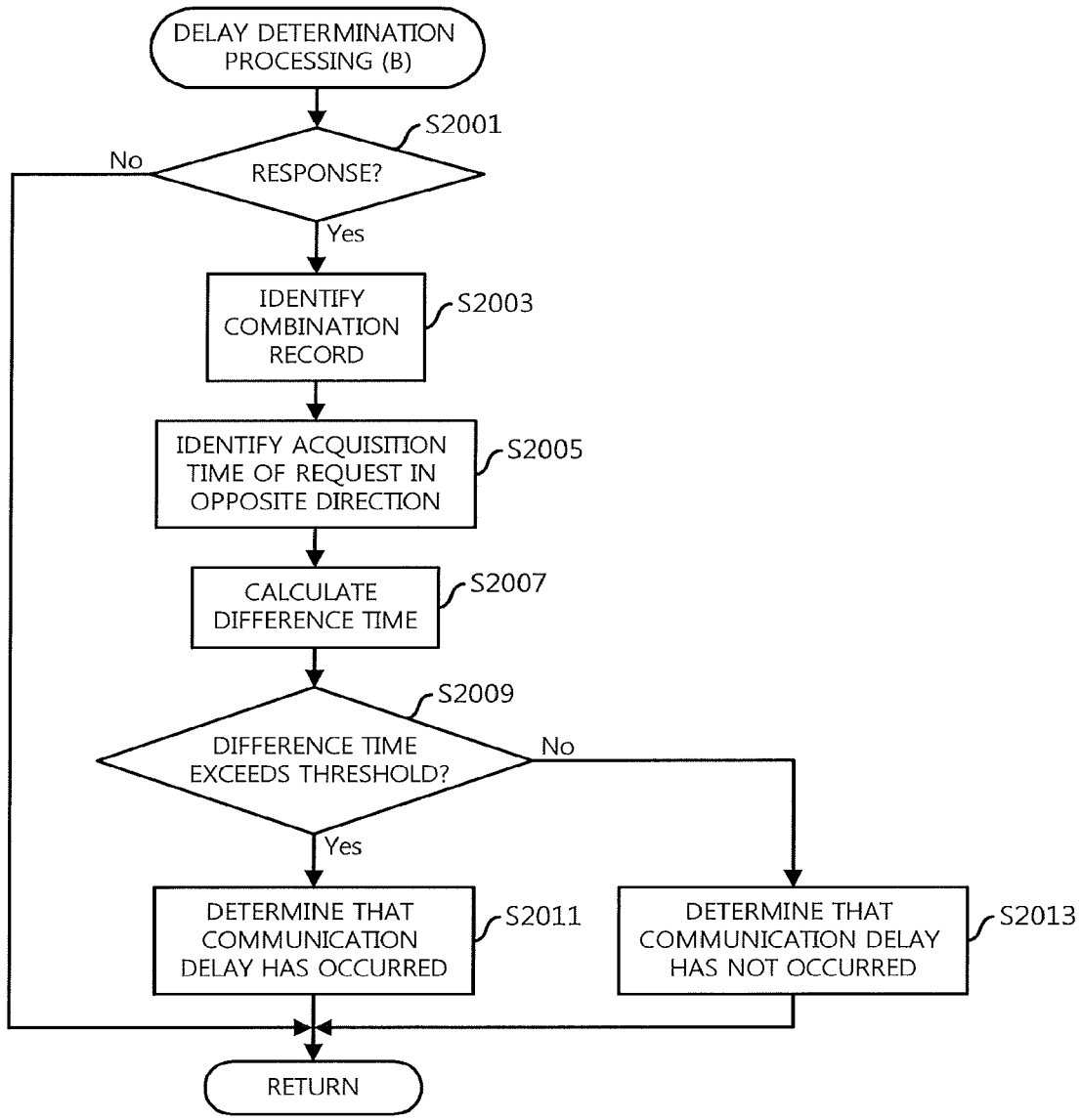
FIG. 20 is a diagram depicting a flow for delay determination processing (B)

Next, the delay determination processing (B) will be explained. The delay determination processing (B) corresponds to the second determination method illustrated in FIG. 4. FIG. 20 illustrates a flow for the delay determination processing (B).

The delay determination unit 1305 determines whether or not the packet obtained in S1801 of FIG. 18 is a response message (S2001). When it is determined that the obtained packet is not a response message, the delay determination processing ends. That is, the condition relating to the communication delay does not change.

On the other hand, when it is determined that the obtained packet is a response message, the delay determination unit 1305 identifies a combination record that corresponds to the source and the destination of the obtained packet in the communication delay table (S2003).

Based on the log table, the delay determination unit 1305 identifies an acquisition time of a request message in a direction opposite to a direction of the obtained packet (S2005). The delay determination unit 1305 calculates a difference time by subtracting the acquisition time of the request message in the opposite direction from the acquisition time of the packet obtained in S1801 of FIG. 18, that is, the acquisition time of this time (S2007). Then, the delay determination unit 1305 determines whether or not the difference time exceeds a threshold (S2009).

When the difference time exceeds the threshold, the delay determination unit 1305 determines that a communication delay has occurred (S2011). On the other hand, when the difference time does not exceed the threshold, the delay determination unit 1305 determines that a communication delay has not occurred (S2013). Then, the processing returns to the calling-source processing.

Figure 21A:
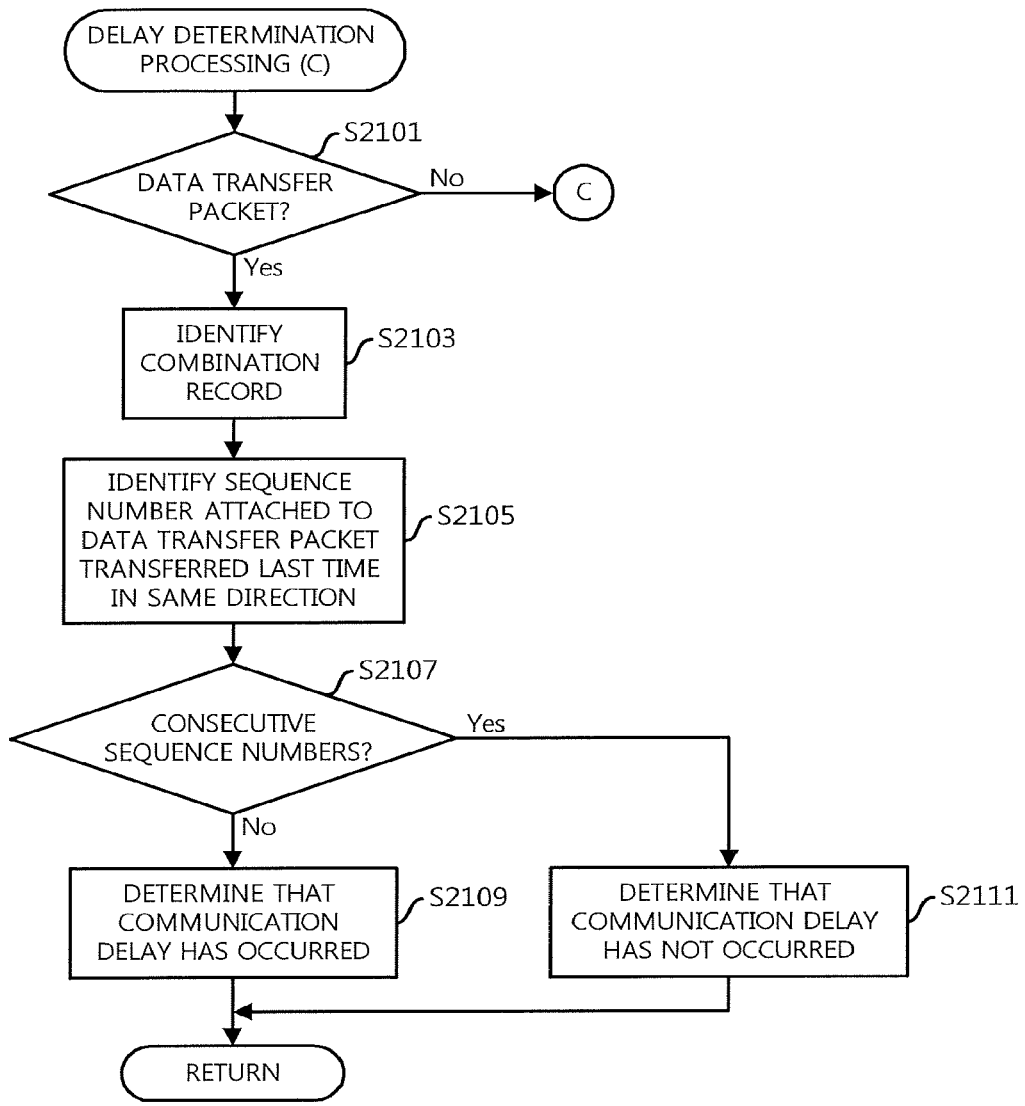
FIG. 21A is a diagram depicting a flow for delay determination processing (C)

Next, the delay determination processing (C) will be explained. The delay determination processing (C) corresponds to the third determination method illustrated in FIGS. 5 and 6. FIG. 21A illustrates a flow for the delay determination processing (C).

The delay determination unit 1305 determines whether or not the packet obtained in S1801 of FIG. 18 is a data transfer packet (S2101).

When it is determined that the obtained packet is a data transfer packet, the delay determination unit 1305 identifies a combination record corresponding to the source and the destination of the obtained packet in the communication delay table (S2103).

Based on the log table, the delay determination unit 1305 identifies a sequence number attached to a data transfer packet transferred the last time among packets in the same direction as a direction of the obtained packet (S2105). Then, the delay determination unit 1305 determines whether or not there is consecutiveness between the identified sequence number of the last time and a sequence number of the data transfer packet transferred this time (S2107). Specifically, when the sequence number of this time is a value obtained by adding data size to the sequence number of the last time, it is determined that there is consecutiveness.

When there is no consecutiveness between the sequence number of the last time and the sequence number of this time, the delay determination unit 1305 determines that a communication delay has occurred (S2109). On the other hand, when there is consecutiveness between the sequence number of the last time and the sequence number of this time, the delay determination unit 1305 determines that a communication delay has not occurred (S2111). Then, the processing returns to the calling-source processing.

Figure 21B:
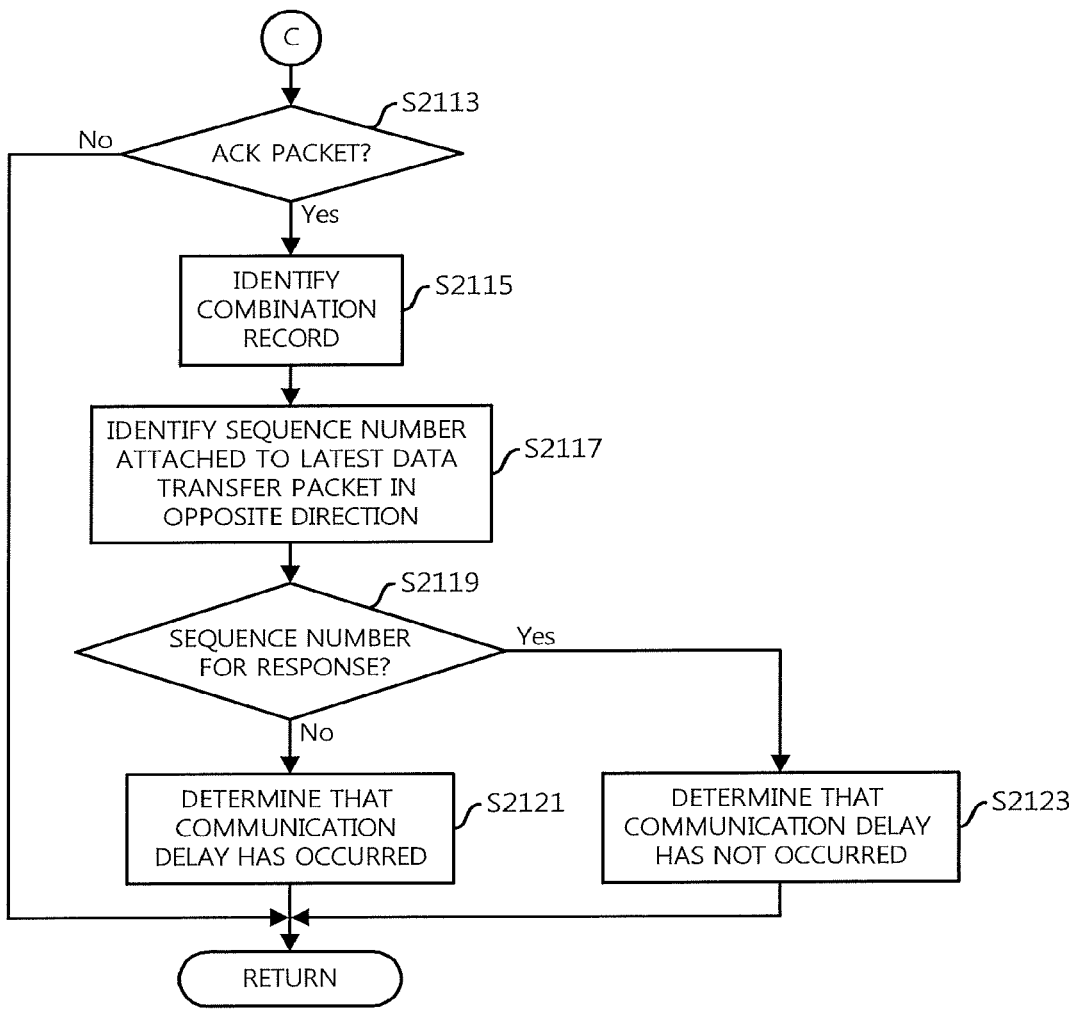
FIG. 21B is a diagram depicting a flow for the delay determination processing (C)

When it is determined in S2101 that the packet obtained in S1801 of FIG. 18 is not a data transfer packet, the processing shifts to S2113 in FIG. 21B.

The delay determination unit 1305 determines whether or not the packet obtained in S1801 in FIG. 18 is an ACK packet (S2113). When it is determined that the obtained packet is not an ACK packet, the delay determination processing (C) ends. That is, the condition relating to the communication delay does not change.

On the other hand, when it is determined that the obtained packet is an ACK packet, the delay determination unit 1305 identifies a combination record that corresponds to the source and the destination of the obtained packet in the communication delay table (S2115).

Based on the log table, the delay determination unit 1305 identifies a sequence number attached to the latest data transfer packet among packets in an opposite direction to a direction of the obtain packet (S2117). The delay determination unit 1305 determines whether or not a sequence number of the ACK packet is a number for a response to the latest data transfer packet in the opposite direction (S2119). When the sequence number of the ACK packet is not the number for the response, the delay determination unit 1305 determines that a communication delay has occurred (S2121). When the sequence number of the ACK packet is the number for the response, the delay determination unit 1305 determines that a communication delay has not occurred (S2123). Then, the processing returns to the calling-source processing.

Any of the delay determination processing (A) to (C) may be executed in S1807 of FIG. 18. Moreover, it may be determined that a communication delay has occurred when the delay determination processing (A) and the delay determination processing (B) are executed and a condition for occurrence of the communication delay is satisfied in both of the determination processing. Furthermore, it may be determined that a communication delay has occurred when the delay determination processing (A) and the delay determination processing (C) are executed and a condition for occurrence of the communication delay is satisfied in both of the determination processing. Furthermore, it may be determined that a communication delay has occurred when the delay determination processing (B) and the delay determination processing (C) are executed and a condition for occurrence of the communication delay is satisfied in both of the determination processing. Furthermore, it may be determined that a communication delay has occurred when the delay determination processing (A) to the delay determination processing (C) are executed and a condition for occurrence of the communication delay is satisfied in each of the determination processing.

Returning to the explanation of FIG. 18, the delay determination unit 1305 stores a determination result of the delay determination processing in the communication delay table (S1809). Specifically, the delay determination unit 1305 updates, in the communication delay table, the condition relating to the communication delay of the combination record that corresponds to the source and the destination of the obtained packet.

Then, the virtual analysis apparatus 211 branches the processing depending on whether or not a communication delay has occurred (S1811). When a communication delay has not occurred, the processing returns to the processing in S1801, and the aforementioned processing is repeated.

On the other hand, when a communication delay has occurred, the node detector 1307 executes machine detection processing (S1813). The node detector 1307 tries to detect the virtual machine 205 that is a bottleneck in the machine detection processing.

Figure 22:
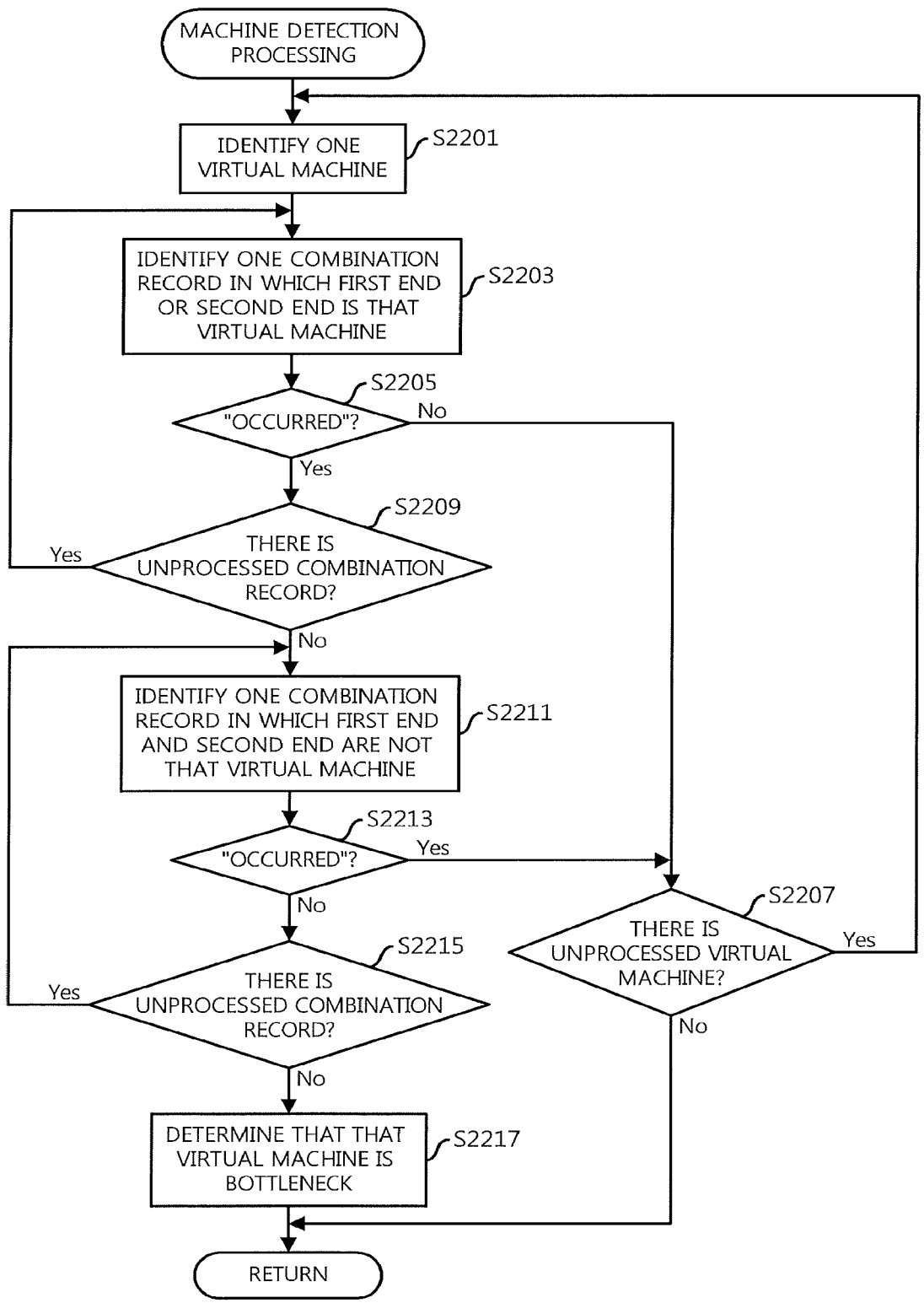
FIG. 22 is a diagram depicting a flow for machine detection processing.

FIG. 22 illustrates a flow for the machine detection processing. The node detector 1307 identifies one virtual machine 205 included in the virtualization system (S2201). However, among the virtual machines 205 included in the virtualization system, the virtual machine 205 that is the source and the virtual machine 205 that is the destination of the packet obtained in S1801 of FIG. 18 may be identified as a target.

The node detector 1307 identifies, in the communication delay table, one combination record in which the first end or the second end is the identified virtual machine 205 (S2203).

The node detector 1307 determines whether or not the condition relating to the communication delay set in the identified combination record is "occurred" (S2205). When the condition relating to the communication delay is not "occurred", the identified virtual machine 205 is not a bottleneck. Therefore, the processing for the identified virtual machine 205 ends, and the processing shifts to processing in S2207.

In S2207, the node detector 1307 determines whether or not there is an unprocessed virtual machine 205. When it is determined that there is no unprocessed virtual machine 205, the processing returns to the calling-source processing without detecting the virtual machine 205 that is a bottleneck. On the other hand, when it is determined that there is an unprocessed virtual machine 205, the processing returns to the processing in S2201 and the aforementioned processing is repeated.

Returning to the explanation of the processing in S2205, when the condition relating to the communication delay is "occurred", the node detector 1307 determines whether or not there is an unprocessed combination record (S2209).

When it is determined that there is an unprocessed combination record, the processing returns to the processing in S2203 and the aforementioned processing is repeated.

On the other hand, when it is determined that there is no unprocessed combination record, there is a possibility that the virtual machine 205 identified in S2201 is a bottleneck. The node detector 1307 identifies, in the communication delay table, one combination record in which both the first end and the second end are not the identified virtual machine 205 (S2211).

The node detector 1307 determines whether or not the condition relating to the communication delay set in the identified combination record is "occurred" (S2213). When the condition relating to the communication delay is "occurred", the virtual machine 205 is not a bottleneck. Therefore, the processing for that virtual machine 205 ends, and the processing shifts to the processing in S2207.

On the other hand, when the condition relating to the communication delay is not "occurred", the node detector 1307 determines whether or not there is an unprocessed combination record (S2215). When it is determined that there is an unprocessed combination record, the processing returns to the processing in S2211, and the aforementioned processing is repeated.

On the other hand, when it is determined that there is no unprocessed combination record, the node detector 1307 determines that the virtual machine 205 identified in S2201 is a bottleneck (S2217). Upon completion of the machine detection processing, the processing returns to the calling-source processing.

Returning to the explanation of FIG. 18, the virtual analysis apparatus 211 branches the processing depending on whether or not the virtual machine 205 that is a bottleneck has been detected in the machine detection processing (S1815).

When the virtual machine 205 that is a bottleneck has been detected, the CPU identification unit 1309 identifies a CPU number allocated to the virtual machine 205 that is a bottleneck (S1817). Specifically, the CPU identification unit 1309 transmits an inquiry for the CPU number allocated to the virtual machine 205 to the hypervisor 203. Alternatively, the CPU identification unit 1309 may output an inquiry for a CPU number that corresponds to a process number of the virtual machine 205 to the OS (operating system) 201. The output processing unit 1311 outputs a name and the CPU number of the virtual machine 205 that is a bottleneck (S1819). One aspect of the output is, for example, screen display or transmission to a terminal. Then, returning to the processing in S1801, the aforementioned processing is repeated.

Figure 23:
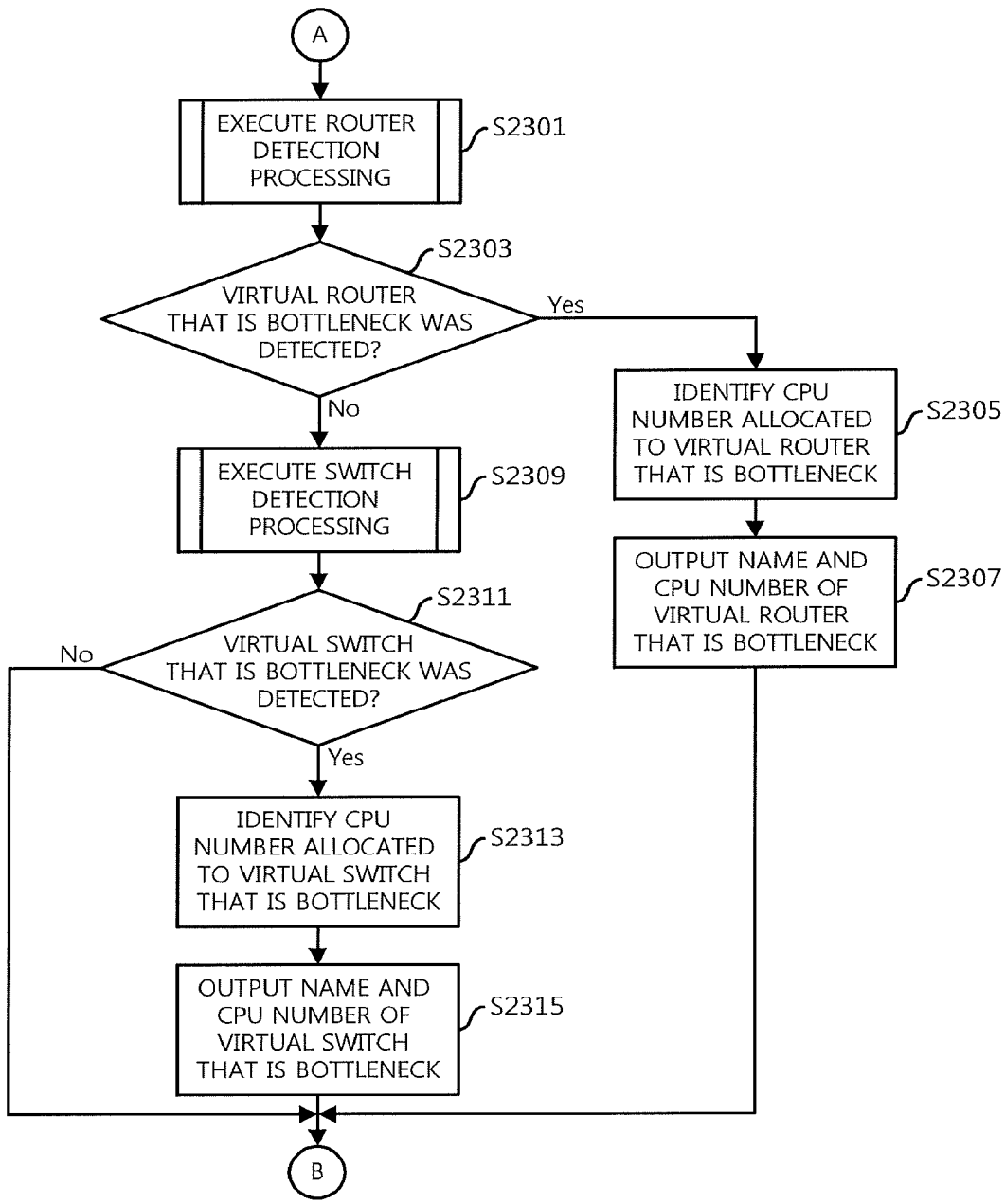
FIG. 23 is a diagram depicting a flow for the main processing (A)

On the other hand, when the virtual machine 205 that is a bottleneck has not been detected, the processing shifts to S2301 in FIG. 23 via terminal A.

FIG. 23 will be explained. The node detector 1307 executes router detection processing (S2301). The node detector 1307 tries to detect the virtual router 209 that is a bottleneck in the router detection processing.

Figure 24:
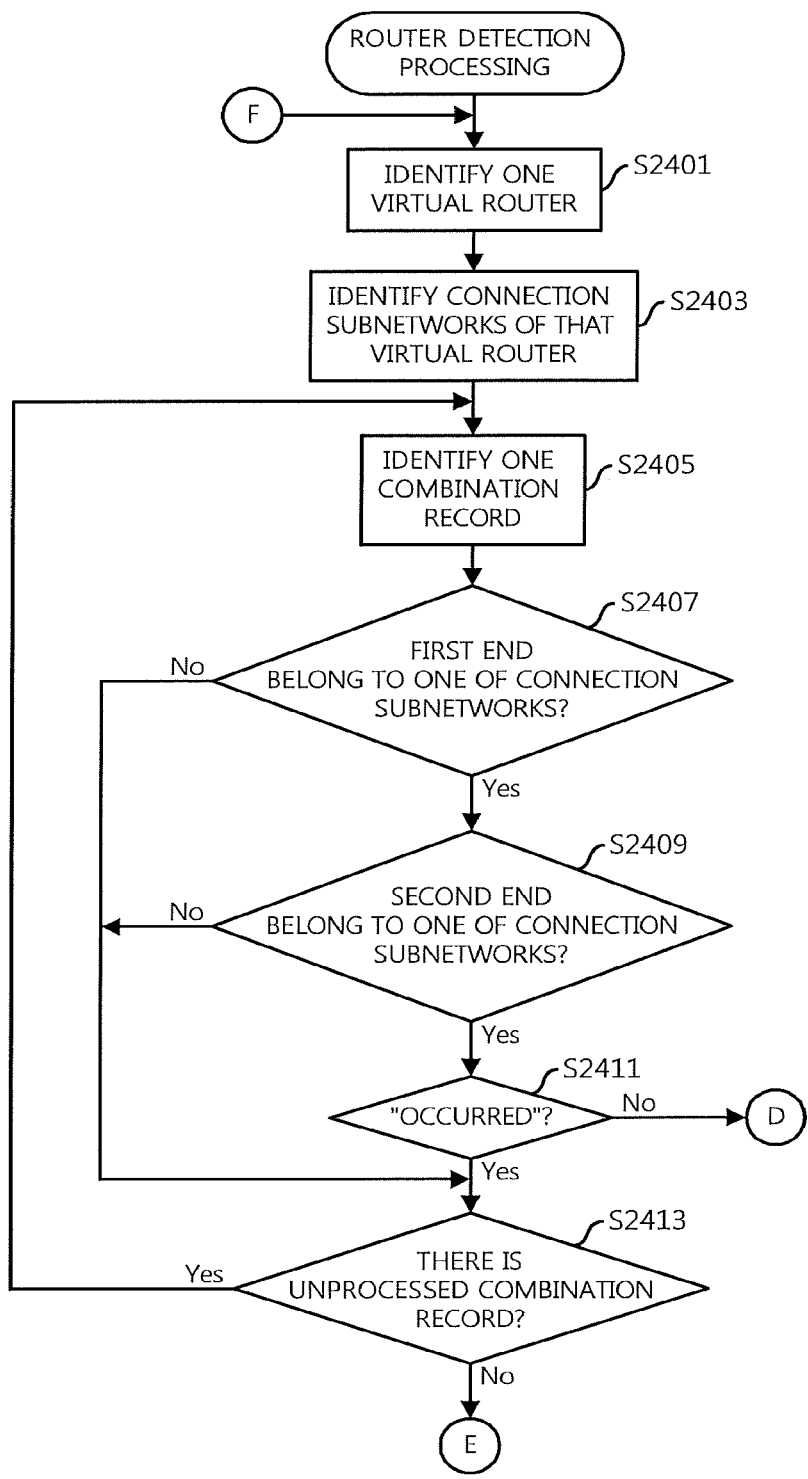
FIG. 24 is a diagram depicting a flow for router detection processing.

FIG. 24 illustrates a flow for the router detection processing. The node detector 1307 identifies one virtual router 209 included in the virtualization system (S2401). The node detector 1307 identifies subnetworks to which the identified virtual router 209 is connected (hereinafter, referred to as a connection subnetwork) (S2403). Specifically, subnetworks are identified by the virtual switches 207 that the identified virtual router 209 connects to.

The node detector 1307 identifies one combination record in the communication delay table (S2405). The node detector 1307 determines whether or not the first end in the identified combination record belongs to any of the connection subnetworks (S2407). When the first end does not belong to any one of connection subnetworks, the virtual communication path of the identified combination record does not include the identified virtual router 209. Therefore, the processing shifts to the processing of S2413.

When the first end belongs to any of the connection subnetworks, the node detector 1307 determines whether or not the second end in the identified combination record belongs to any of the connection subnetworks (S2409). When the second end does not belong to any one of the connection subnetworks, the virtual communication path of the identified combination record does not include the identified virtual router 209. Therefore, the processing shifts to the processing of S2413.

On the other hand, when the second end belongs to any of the connection subnetworks, the node detector 1307 determines whether or not the condition relating to the communication delay set in the identified combination record is "occurred" (S2411).

When the condition relating to the communication delay set in the identified combination record is not "occurred", the identified virtual router 209 is not a bottleneck. In this case, the processing shifts to the processing in S2507 of FIG. 25 via terminal D.

On the other hand, when the condition relating to the communication delay set in the identified combination record is "occurred", the node detector 1307 determines whether or not there is an unprocessed combination record (S2413). When it is determined that there is an unprocessed combination record, the processing returns to the processing in S2405 and the aforementioned processing is repeated.

When it is determined that there is no unprocessed combination record, there is a possibility that the virtual router 209 is a bottleneck. In this case, the processing shifts to S2501 in FIG. 25 via terminal E.

Figure 25:
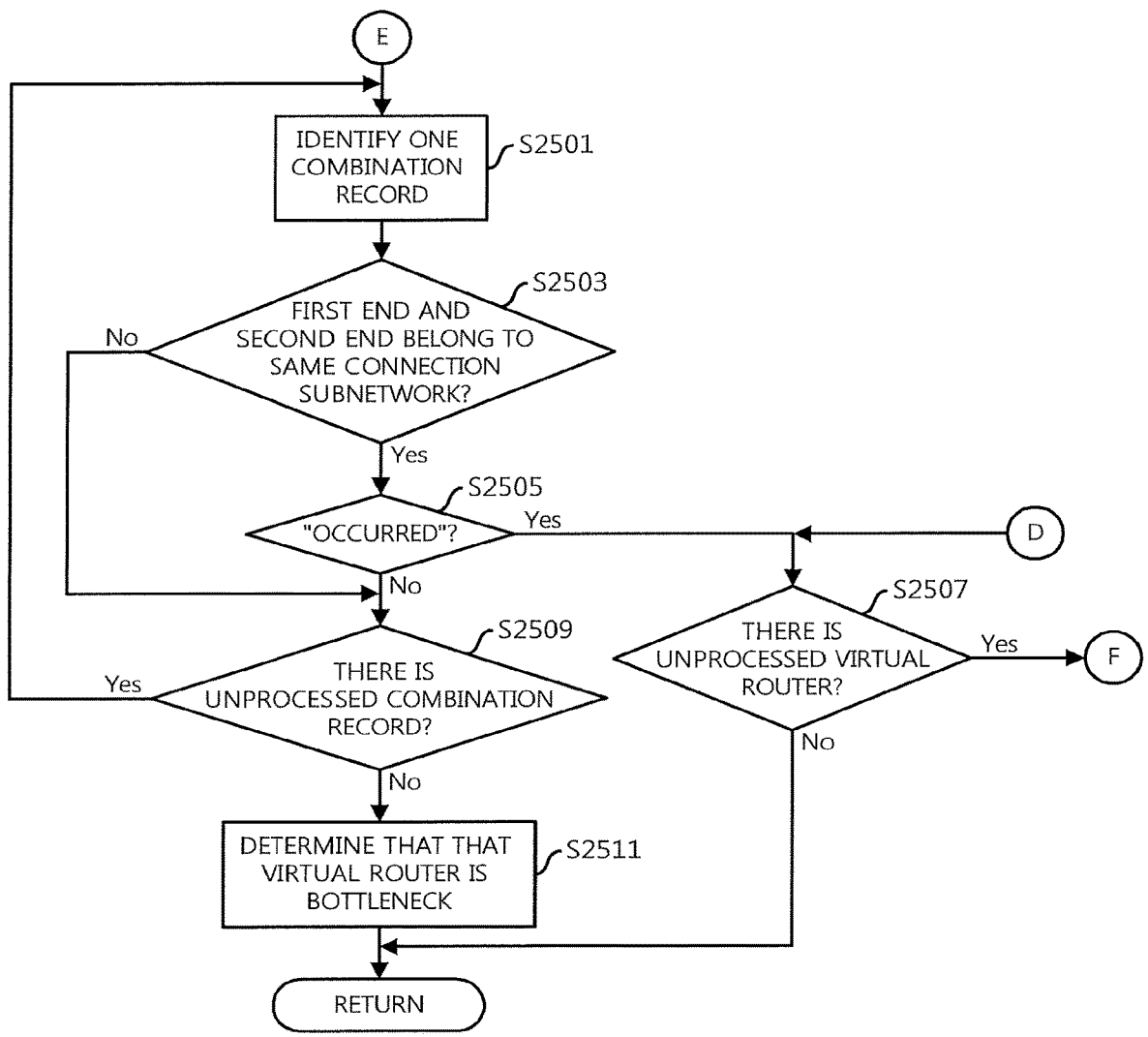
FIG. 25 is a diagram depicting a flow for the router detection processing.

FIG. 25 will be explained. The node detector 1307 identifies one combination record in the communication delay table again (S2501). The node detector 1307 determines whether or not the first end and the second end in the identified combination record belong to the same connection subnetwork (S2503).

When the first end and the second end do not belong to the same connection subnetwork, the processing shifts to S2509. On the other hand, when the first end and the second end belong to the same connection subnetwork, the node detector 1307 determines whether or not the condition relating to the communication delay set in the identified combination record is "occurred" (S2505). When it is determined that the condition relating to the communication delay is "occurred", the identified virtual router 209 is not a bottleneck. Accordingly, the processing shifts to S2507.

In S2507, the node detector 1307 determines whether or not there is an unprocessed virtual router 209. When it is determined that there is no unprocessed virtual router 209, the processing returns to the processing of the calling-source processing without detecting the virtual router 209 that is a bottleneck. On the other hand, when it is determined that there is an unprocessed virtual router 209, the processing returns to the processing in S2401 of FIG. 24 via terminal F and the aforementioned processing is repeated.

Returning to the explanation of the processing in S2505, when the condition relating to the communication delay is not "occurred", it is determined whether or not there is an unprocessed combination record (S2509). When it is determined that there is an unprocessed combination record, the processing returns to the processing in S2501 and the aforementioned processing is repeated.

On the other hand, when there is no unprocessed combination record, the node detector 1307 determines that the identified virtual router 209 is a bottleneck (S2511) and the router detection processing ends. Upon completion of the router detection processing, the processing returns to the calling-source processing.

Returning to the explanation of FIG. 23, the virtual analysis apparatus 211 branches the processing depending on whether or not the virtual router 209 that is a bottleneck has been detected in the router detection processing (S2303).

When detecting the virtual router 209 that is a bottleneck, the CPU identification unit 1309 identifies a CPU number allocated to the virtual router 209 that is a bottleneck (S2305). Specifically, the CPU identification unit 1309 transmits an inquiry for the CPU number allocated to the virtual router 209 to the hypervisor 203. Alternatively, the CPU identification unit 1309 may transmit an inquiry for a CPU number that corresponds to a process number of the virtual router 209 to the OS 201. The output processing unit 1311 outputs a name and the CPU number of the virtual router 209 that is a bottleneck (S2307). Then, the processing returns to the processing in S1801 of FIG. 18 via terminal B, and the aforementioned processing is repeated.

On the other hand, when the virtual router 209 that is a bottleneck has not been detected, the node detector 1307 executes switch detection processing (S2309). The node detector 1307 tries to detect the virtual switch 207 that is a bottleneck in the switch detection processing.

Figure 26:
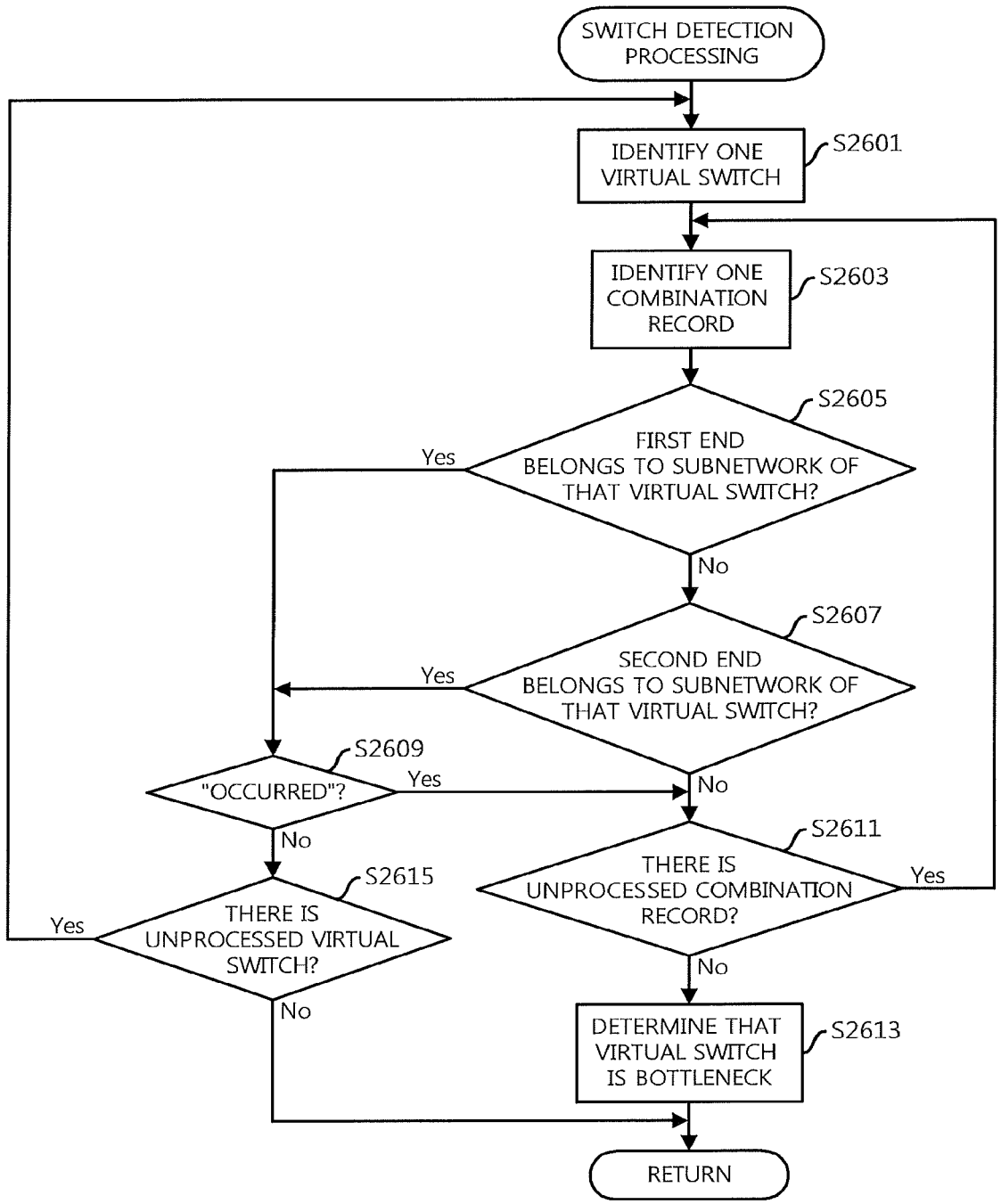
FIG. 26 is a diagram depicting a flow for switch detection processing.

FIG. 26 illustrates a flow for the switch detection processing. The node detector 1307 identifies one virtual switch 207 included in the virtualization system (S2601).

The node detector 1307 identifies one combination record in the communication delay table (S2603).

The node detector 1307 determines whether or not the first end in the identified combination record belongs to a subnetwork of the identified virtual switch 207 (S2605). When it is determined that the first end does not belong to a subnetwork of that virtual switch 207, the node detector 1307 determines whether or not the second end in the identified combination record belongs to a subnetwork of the identified virtual switch 207 (S2607).

When it is determined that the first end belongs to a subnetwork of the identified virtual switch 207 or when it is determined that the second end belongs to a subnetwork of the identified virtual switch 207, the processing shifts to S2609.

On the other hand, when it is determined that the second end does not belong to a subnetwork of the identified virtual switch 207, the processing shifts to S2611.

In S2609, the node detector 1307 determines whether or not the condition relating to the communication delay set in the identified combination record is "occurred". When the condition is "occurred", the node detector 1307 determines whether or not there is an unprocessed combination record (S2611).

When it is determined that there is an unprocessed combination record, the processing returns to the processing in S2603 and the aforementioned processing is repeated. On the other hand, when it is determined that there is no unprocessed combination record, the node detector 1307 determines that the identified virtual switch 207 is a bottleneck (S2613). Then the processing returns to the calling-source processing.

Returning to the explanation of the processing in S2609, when the condition relating to the communication delay set in the identified combination record is not "occurred", the identified virtual switch 207 is not a bottleneck. In this case, the node detector 1307 determines whether or not there is an unprocessed virtual switch 207 (S2615).

When it is determined that there is an unprocessed virtual switch 207, the processing returns to the processing in S2601, and the aforementioned processing is repeated. On the other hand, when it is determined that there is not an unprocessed virtual switch 207, the switch detection processing ends and the processing returns to the calling-source processing.

Returning to the explanation of FIG. 23, the virtual analysis apparatus 211 branches the processing depending on whether or not the virtual switch 207 that is a bottleneck has been detected in the switch detection processing (S2311).

When detecting the virtual switch 207 that is a bottleneck, the CPU identification unit 1309 identifies a CPU number allocated to the virtual switch 207 that is a bottleneck (S2313). Specifically, the CPU identification unit 1309 inquires the hypervisor 203 of the CPU number allocated to the virtual switch 207. Alternatively, the CPU identification unit 1309 may query the OS 201 for the CPU number corresponding to the process number of the virtual switch 207. The output processing unit 1311 outputs a name and the CPU number of the virtual switch 207 that is a bottleneck (S2315). Then, the processing returns to the processing in S1801 of FIG. 18 via the terminal B, and the aforementioned processing is repeated.

On the other hand, when the virtual switch 207 that is a bottleneck has not been detected, the processing returns to the processing in S1801 of FIG. 18 via terminal B, and the aforementioned processing is repeated. The explanation for the analysis example that is a basis is ended.

Next, an example of improving the aforementioned analysis example will be explained. In the first to third aspects, there is one bottleneck. In these aspects, it is assumed that the processing load of a CPU allocated to one virtual node increases.

In this example, it is also assumed that there are two bottlenecks. In these aspects, it is assumed that the processing load of a CPU allocated to two virtual nodes increases.

Figure 27:
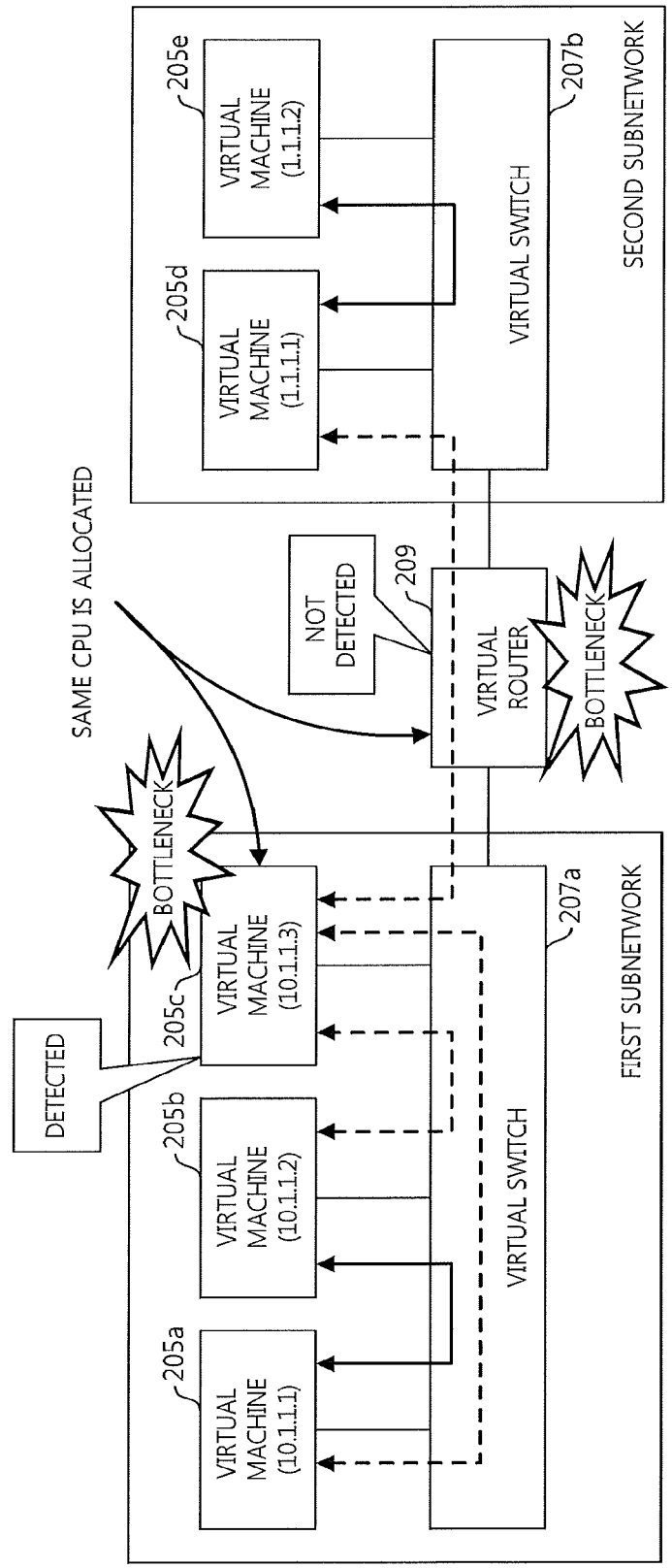
FIG. 27 is a diagram depicting a fourth aspect of a bottleneck.

FIG. 27 illustrates a fourth aspect of the bottleneck. In a fourth aspect, the virtual machine 205 and the virtual router 209 are bottlenecks. When the same CPU is allocated to the virtual machine 205 and the virtual router 209 and a processing load of the CPU increases, these virtual nodes become bottlenecks. In this example, it is assumed that the virtual machine 205c and the virtual router 209 are bottlenecks. A delay occurs in a virtual communication path in which is the virtual machine 205c that is a bottleneck is a source or destination and a virtual communication path in which the virtual router 209 that is a bottleneck relays. In this example, a delay occurs in the second communication path to the fourth communication path. On the other hand, no delay occurs in the first communication path and the fifth communication path.

FIG. 28 illustrates the communication delay table in the fourth aspect of the bottleneck. The condition relating to the communication delay in the second to fourth combination records is "occurred". On the other hand, the condition relating to the communication delay in the first and fifth combination records is "not occurred". In this aspect, a bottleneck of the virtual machine 205c is detected in the analysis example that is a basis, but a bottleneck of the virtual router 209 is not detected.

Figure 29:
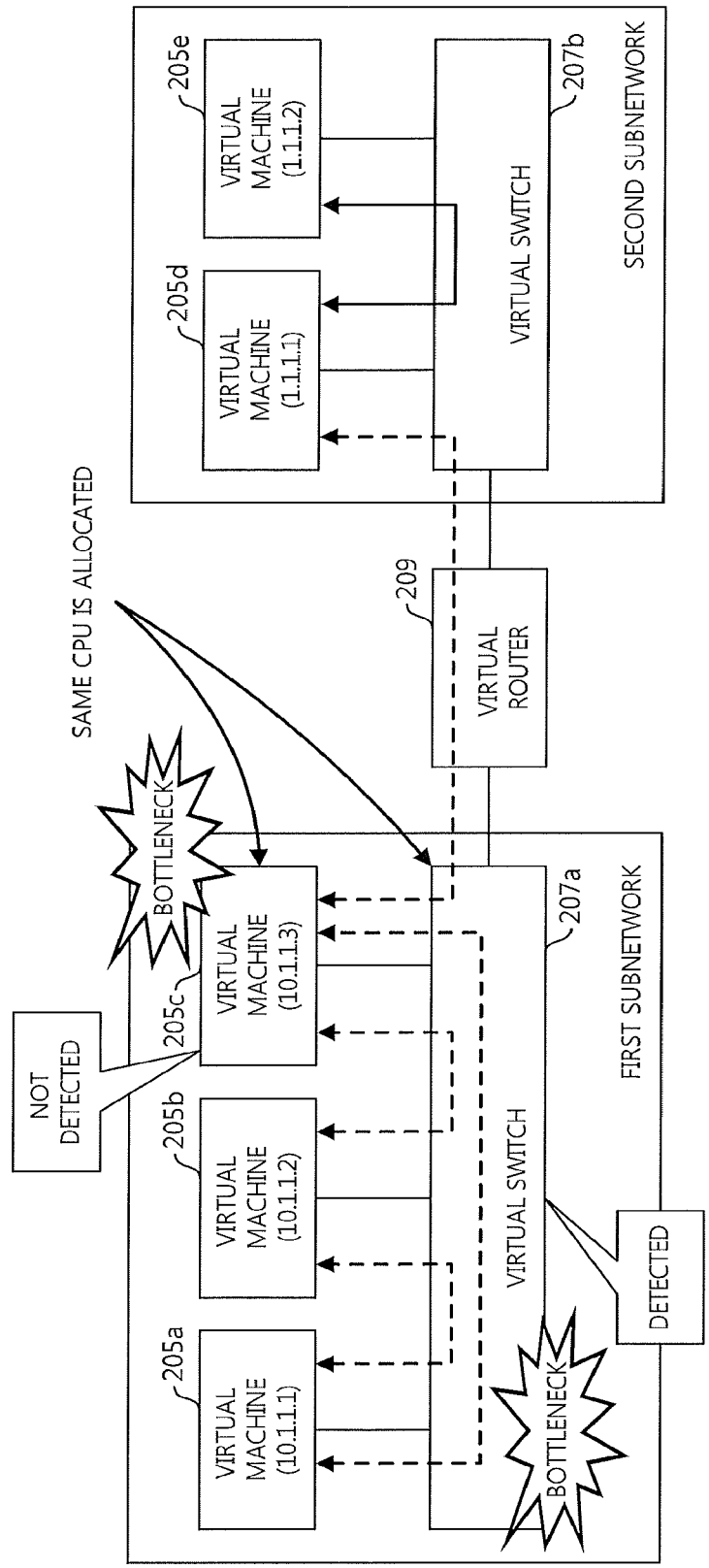
FIG. 29 is a diagram depicting a fifth aspect of a bottleneck.

Next, the fifth aspect of the bottleneck will be explained. FIG. 29 illustrates a fifth aspect of the bottleneck. In the fifth aspect, the virtual machine 205 and the virtual switch 207 are bottlenecks. The same CPU is allocated to the virtual machine 205 and the virtual switch 207, and when a processing load of the CPU increases, these virtual nodes become bottlenecks. In this example, it is assumed that the virtual machine 205c and the virtual switch 207a are bottlenecks. A delay occurs in a virtual communication path in which is the virtual machine 205c that is a bottleneck is a source or destination and a virtual communication path in which the virtual switch 207a that is a bottleneck relays. In this example, a delay occurs in the first communication path to the fourth communication path. On the other hand, no delay occurs in the fifth communication path.

FIG. 30 illustrates the communication delay table in the fifth aspect of the bottleneck. The condition relating to the communication delay in the first to fourth combination records is "occurred". On the other hand, the condition relating to the communication delay in the fifth combination record is "not occurred". In this aspect, a bottleneck of the virtual switch 207a is detected in the analysis example that is a basis, but a bottleneck of the virtual machine 205c is not detected.

Figure 31:
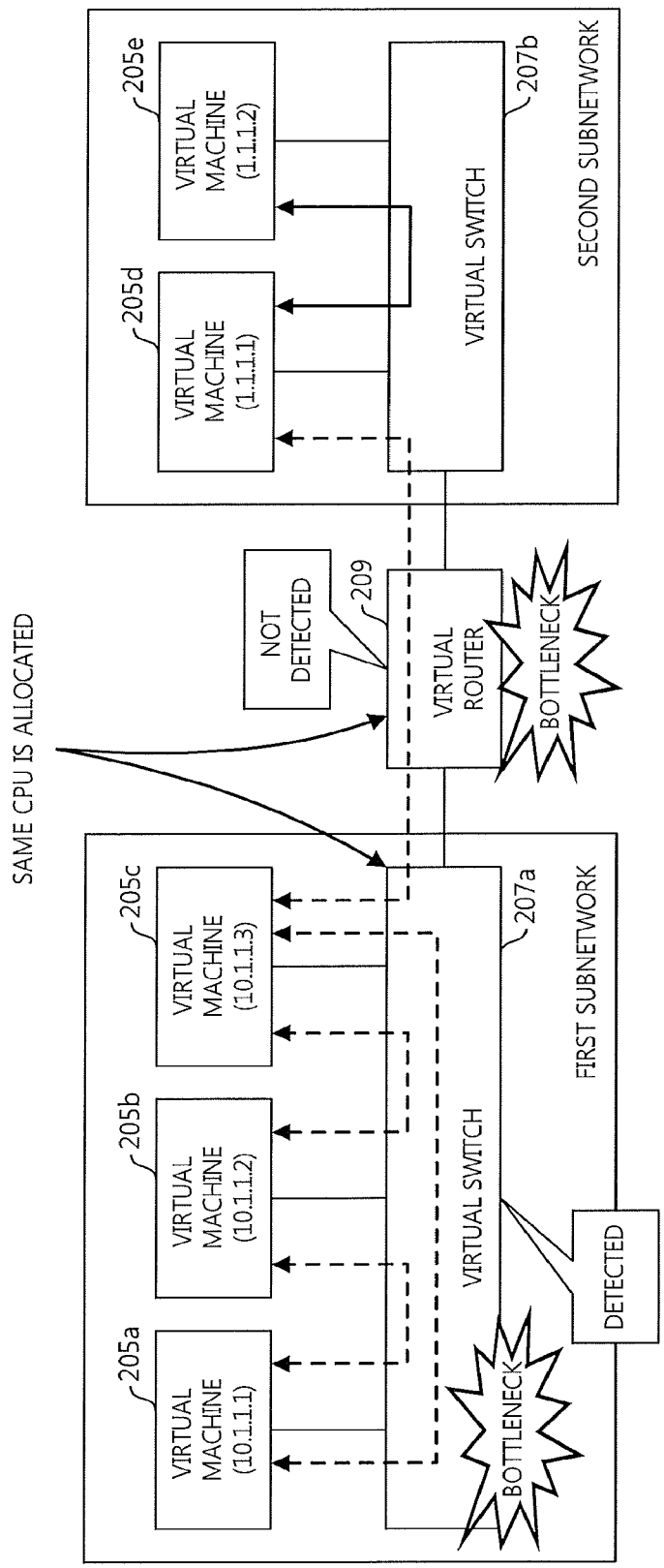
FIG. 31 is a diagram depicting a sixth aspect of a bottleneck.

FIG. 31 illustrates a sixth aspect of the bottleneck. In the sixth aspect, the virtual switch 207 and the virtual router 209 are bottlenecks. When the same CPU is allocated to the virtual switch 207 and the virtual router 209 and a processing load of the CPU increases, these virtual nodes become bottlenecks. In this example, it is assumed that the virtual switch 207a and the virtual router 209 are bottlenecks. A delay occurs in a virtual communication path in which the virtual switch 207a that is a bottleneck relays and a virtual communication path in which the virtual router 209 that is a bottleneck relays. In this example, a delay occurs in the first communication path to the fourth communication path. On the other hand, no delay occurs in the fifth communication path.

The communication delay table in the sixth aspect of the bottleneck is the same as the case of the fifth aspect illustrated in FIG. 30. In this aspect, a bottleneck of the virtual switch 207a is detected in the analysis example that is a basis, but a bottleneck of the virtual router 209 is not detected. The explanation for the aspects of bottlenecks ends.

As a processing load of a CPU in which plural programs are executed in parallel increases, cache misses increase when each program is executed. In this embodiment, bottlenecks that are not detected in the analysis example that is a basis are specified by focusing on the number of additional cache misses.

Figures 32, 33:
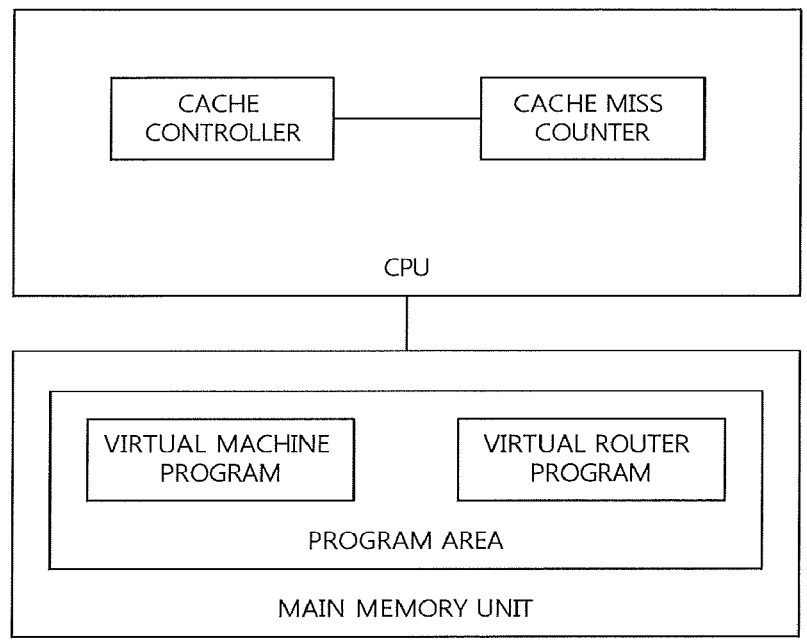
FIG. 32 is a diagram depicting an example of a configuration of a CPU.
FIG. 33 is a diagram depicting an example of a cache miss table.

With reference to FIG. 32, an operation of a CPU relating to cache misses will be explained. A main memory unit is connected to the CPU. A program to be executed by the CPU is loaded into a program area of the main memory unit connected to the CPU. In this example, it is assumed that a program for realizing the virtual machine 205 (hereinafter, referred to as a virtual machine program) and a program for realizing the virtual router 209 (hereinafter, referred to as a virtual router program) are loaded.

The CPU has a cache controller for controlling the cache of data used for executing a program. Then, the CPU counts the number of occurrences of cache misses. Specifically, when the cache controller detects a cache miss, 1 is added to the number of cache misses stored in the cache miss counter. In this example, as a load of the CPU increases, the number of cache misses in the virtual machine program tends to increase. Furthermore, the number of cache misses in the virtual router program tends to increase.

With reference to FIG. 33, a cache miss table in which the number of cache misses is recorded will be explained. The cache miss table is provided for each program of the virtual node. The cache miss table has a record that corresponds to a timing at which the virtual analysis apparatus 211 obtains the number of cache misses through the OS 201 from the CPU. The record of the cache miss table has a field for storing the number of cache misses, a field for storing the number of incremental cache misses, and a field for storing an acquisition time.

The number of incremental cache misses is the number of cache misses that have increased compared to the number of cache misses a predetermined time before the current time. The acquisition time identifies a time point at which the number of cache misses is obtained.

Figure 34:
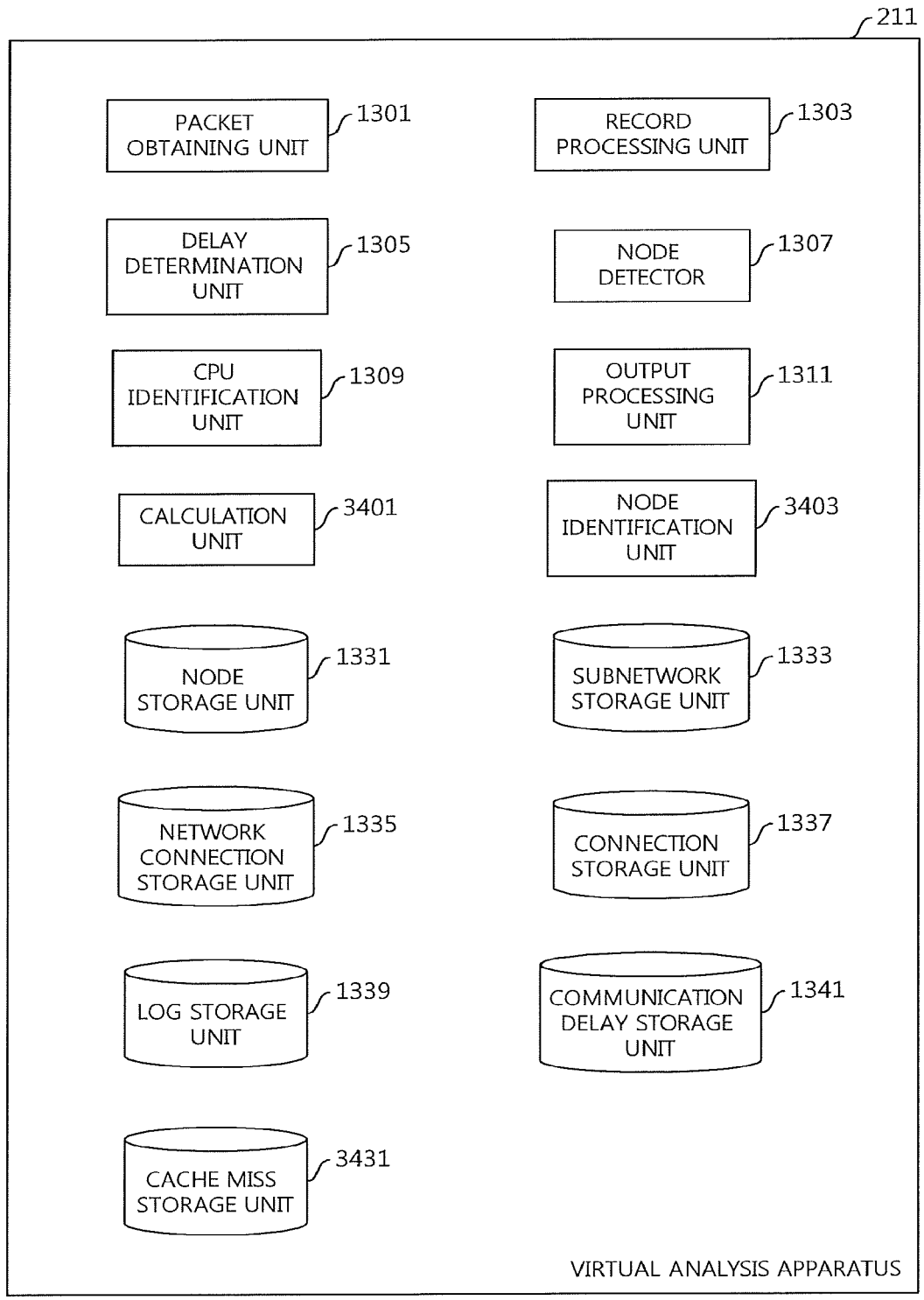
FIG. 34 is a diagram depicting an example of a module configuration of the virtual analysis apparatus in a first embodiment.

FIG. 34 illustrates an example of a module configuration of the virtual analysis apparatus 211 relating to an improvement example. In addition to the packet obtaining unit 1301 to the output processing unit 1311, the virtual analysis apparatus 211 includes a calculation unit 3401 and a node identification unit 3403. The calculation unit 3401 calculates the number of incremental cache misses. The node identification unit 3403 identifies a virtual node that is a bottleneck. The calculation unit 3401 and the node identification unit 3403 are realized by using hardware resources (for example, FIG. 50) and a program that causes a processor to execute the processing described below.

Furthermore, the virtual analysis apparatus 211 has a cache miss storage unit 3431 in addition to the node storage unit 1331 to the communication delay storage unit 1341. The cache miss storage unit 3431 stores the aforementioned cache miss table. The cache miss storage unit 3431 is realized by using hardware resources (for example, FIG. 50).

Next, processing in the virtual analysis apparatus 211 will be explained. First, calculation processing will be explained. In the calculation processing, the number of incremental cache misses is calculated for each virtual node. The calculation processing is executed in parallel with the main processing.

Figure 35:
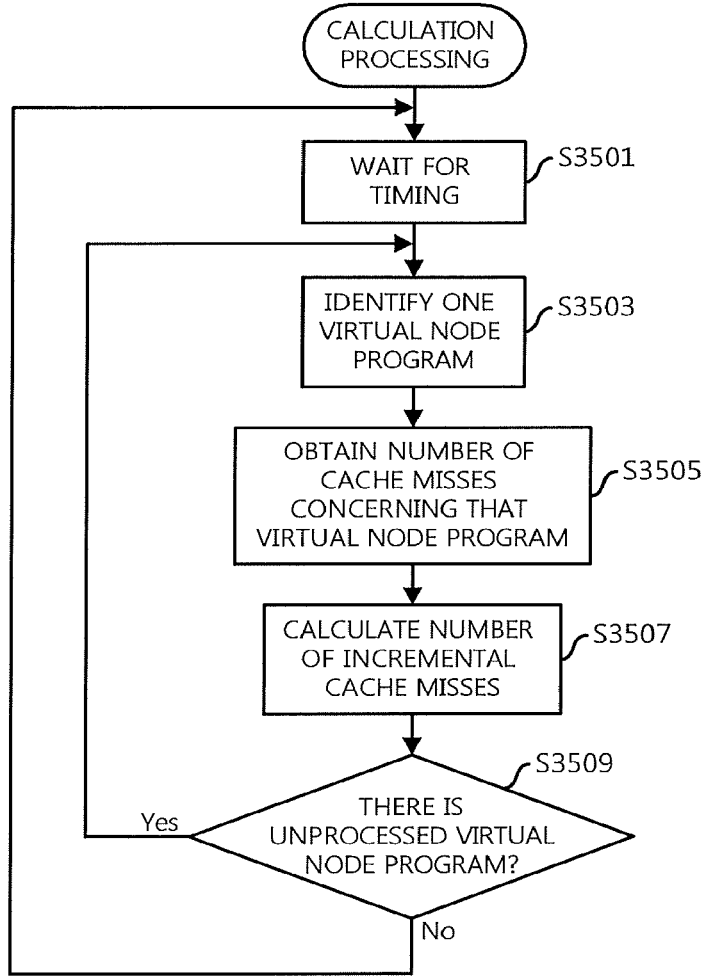
FIG. 35 is a diagram depicting a flow for calculation processing.

FIG. 35 illustrates a flow for the calculation processing. The calculation unit 3401 waits for a cyclic timing (S3501).

Upon reaching the timing, the calculation unit 3401 identifies one program (hereinafter, referred to as a virtual node program) for realizing a virtual node (S3503). Specifically, a virtual machine program, a program for realizing the virtual switch 207 (hereinafter, referred to as a virtual switch program) and a virtual router program are identified in order.

The calculation unit 3401 obtains a current number of cache misses with respect to the identified virtual node program (S3505). The calculation unit 3401 sets a new record in the cache miss table and stores the number of cache misses in the new record.

Furthermore, the calculation unit 3401 calculates the number of the incremental cache misses (S3507). Specifically, the calculation unit 3401 calculates the number of incremental cache misses by subtracting the number of cache misses a predetermined time before the current time from the current number of cache misses. The number of incremental cache misses is stored in the new record.

The calculation unit 3401 determines whether or not there is an unprocessed virtual node program (S3509). When it is determined that there is an unprocessed virtual node program, the processing returns to the processing in S3503 and the aforementioned processing is repeated. On the other hand, when it is determined that there is no unprocessed virtual node program, the processing returns to the processing in S3501 and waits for the next timing.

Figure 36:
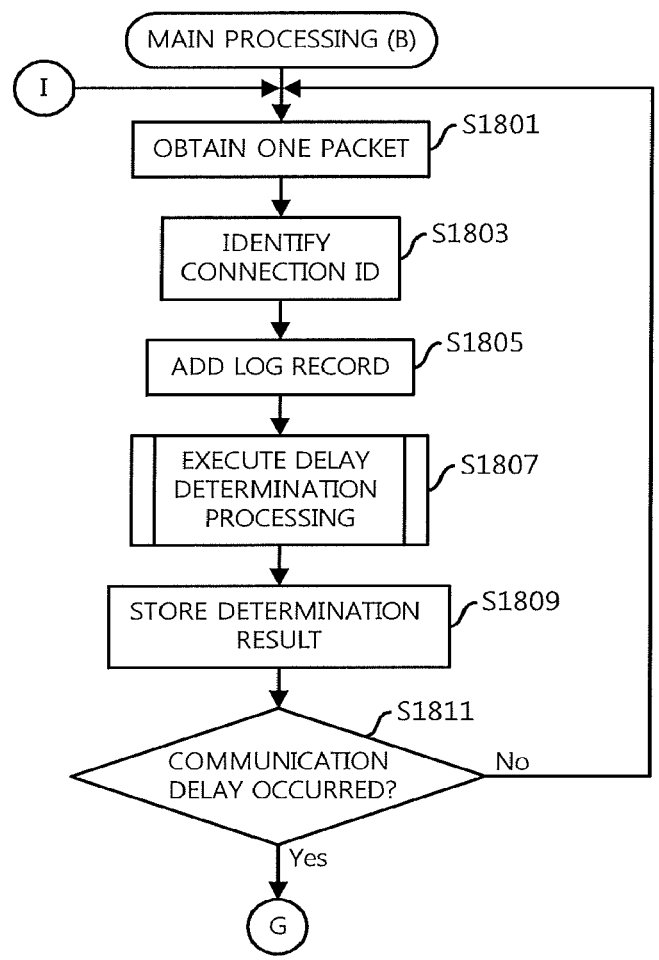
FIG. 36 is a diagram depicting a flow for main processing (B)

In the improvement example, main processing (B) is executed instead of the main processing (A). FIG. 36 illustrates a flow for the main processing (B). The processing of S1801 to S1811 is the same as in the case of FIG. 18. Upon completion of the processing in S1811, the processing shifts to S3701 illustrated in FIG. 37 via terminal Shifting to an explanation of FIG. 37, as in the case of S1813 of FIG. 18, the node detector 1307 executes the machine detection process (S3701). As in the case of S 1815 of FIG. 18, the virtual analysis apparatus 211 branches the processing depending on whether or not the virtual machine 205 that is a bottleneck has been detected (S3703).

When the virtual machine 205 that is a bottleneck has been detected, the node identification unit 3403 executes the first router identification processing (S3705). In the first router identification processing, the node identification unit 3403 tries to identify a virtual router program being executed in parallel by the CPU on which the virtual machine program related to the bottleneck is being executed. The identified virtual router 209 is a bottleneck.

Figure 38:
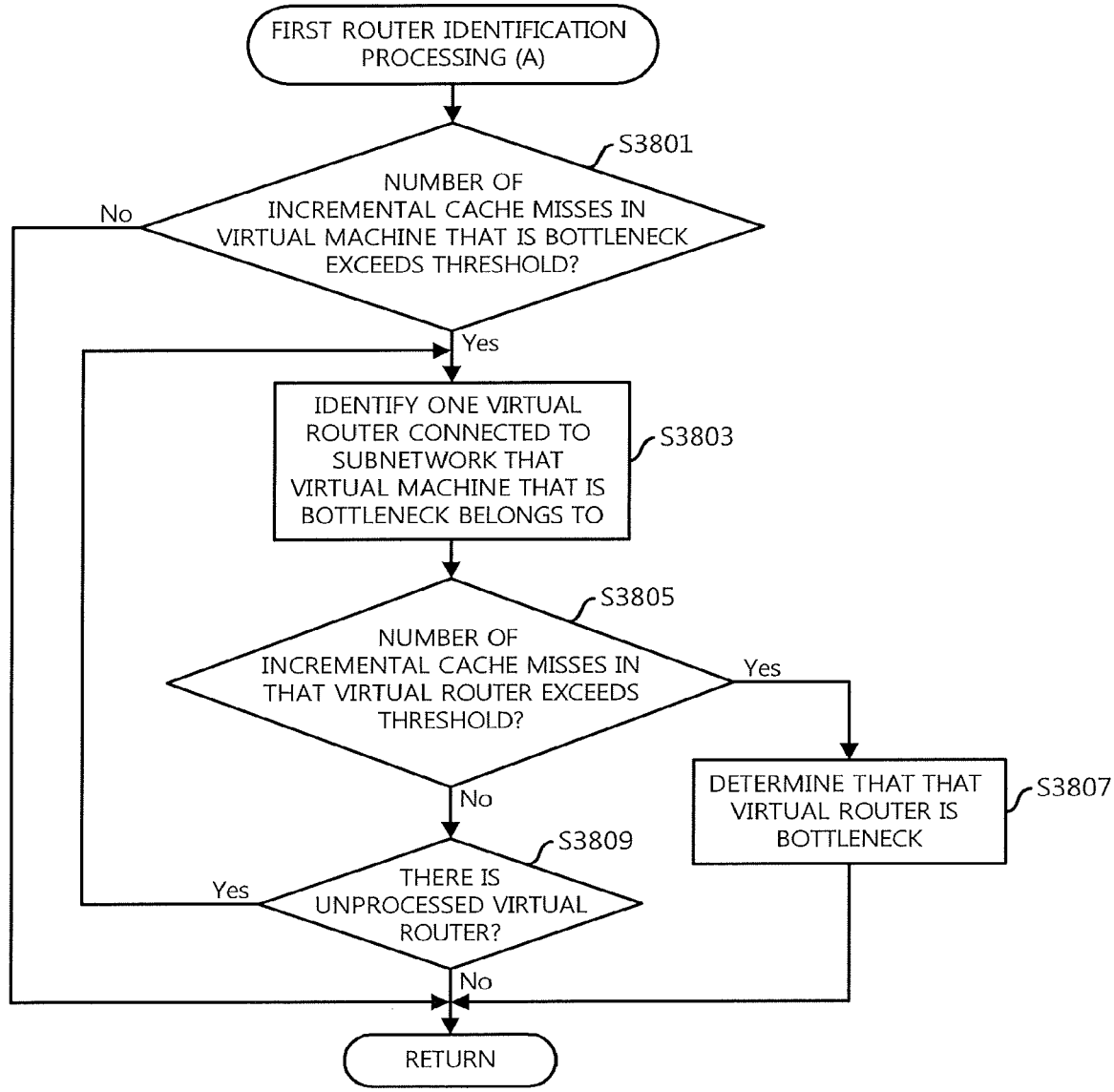
FIG. 38 is a diagram depicting a flow for first router identification processing (A)

Here, the first router identification processing (A) is executed. FIG. 38 illustrates a flow for the first router identification processing (A).

The node identification unit 3403 determines whether or not the number of incremental cache misses in the virtual machine 205 that is a bottleneck exceeds a threshold (S3801). When it is determined that the number of incremental cache misses does not exceed the threshold, the first router identification processing (A) ends and the processing returns to the calling-source processing.

On the other hand, when it is determined that the number of incremental cache misses in the virtual machine 205 that is a bottleneck exceeds the threshold, the node identification unit 3403 identifies the virtual router 209 that connects to a subnetwork to which the virtual machine 205 that is a bottleneck belongs (S3803). Specifically, the node identification unit 3403 identifies a virtual switch 207 that connects to the virtual machine 205 that is a bottleneck, and identifies one virtual router 209 that connects to the identified virtual switch 207.

The node identification unit 3403 determines whether or not the number of incremental cache misses in the identified virtual router 209 exceeds a threshold (S3805). When it is determined that the number of incremental cache misses in the identified virtual router 209 exceeds the threshold, the node identification unit 3403 determines that the identified virtual router 209 is a bottleneck (S3807). Then, the processing returns to the calling-source processing.

On the other hand, when it is determined that the number of incremental cache misses in the identified virtual router 209 does not exceed the threshold, the node identification unit 3403 determines whether or not there is an unprocessed virtual router 209 (S3809). When it is determined that there is an unprocessed virtual router 209, the processing returns to the processing in S3803 and the aforementioned processing is repeated.

On the other hand, when it is determined that there is no unprocessed virtual router 209, there is no virtual router 209 which is a bottleneck. In this case, the processing returns to the processing of the calling-source processing.

Figure 37:
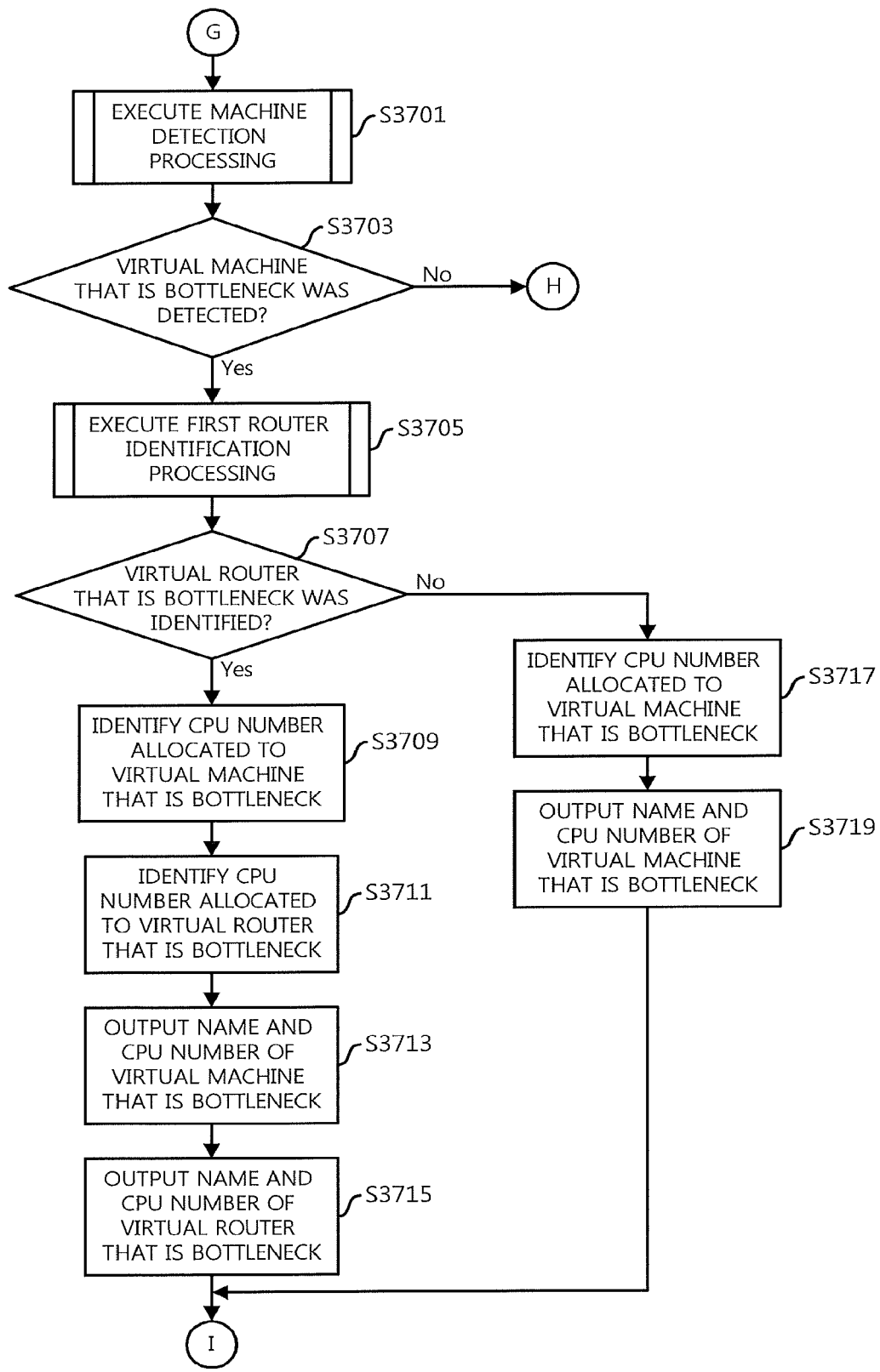
FIG. 37 is a diagram depicting a flow for the main processing (B)

Returning to the explanation of FIG. 37, the virtual analysis apparatus 211 branches the processing depending on whether or not the virtual router 209 that is a bottleneck has been identified in the first router identification processing (S3707).

In the case of identifying the virtual router 209 that is a bottleneck, the CPU identification unit 1309 identifies a CPU number allocated to the virtual machine 205 that is a bottleneck (S3709). Further, the CPU identification unit 1309 identifies a CPU number allocated to the virtual router 209 that is a bottleneck (S3711). The output processing unit 1311 outputs a name and the CPU number of the virtual machine 205 that is a bottleneck (S3713). Furthermore, the output processing unit 1311 outputs a name and the CPU number of the virtual router 209 that is a bottleneck (S3715). Then, the processing returns to the processing in S1801 of FIG. 36 via terminal I, and the aforementioned processing is repeated.

On the other hand, when the virtual router 209 that is a bottleneck has not been identified, the CPU identification unit 1309 identifies a CPU number allocated to the virtual machine 205 that is a bottleneck (S3717). The output processing unit 1311 outputs a name and the CPU number of the virtual machine 205 that is a bottleneck (S3719). Then, the processing returns to the processing in S1801 of FIG. 36 via terminal I, and the aforementioned processing is repeated.

Figure 39:
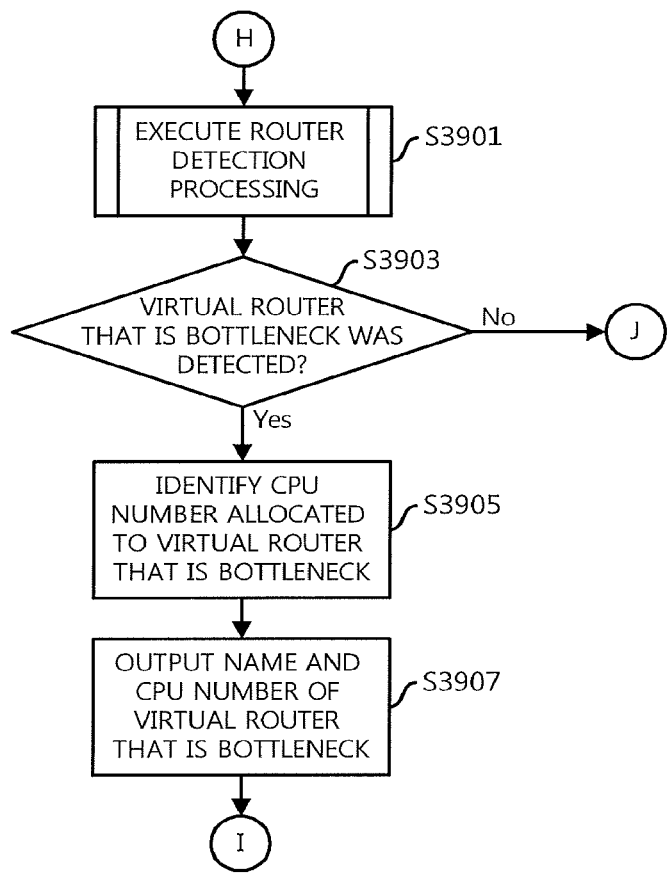
FIG. 39 is a diagram depicting a flow for the main processing (B)

Returning to the explanation of S3703, when it is determined that the virtual machine 205 that is a bottleneck has not been detected, the processing shifts to S3901 of FIG. 39 via terminal H.

The processing of S3901 to S3907 of FIG. 39 is the same as the processing of S2301 to S2307 of FIG. 23. Upon completion of the processing of S3907, the processing returns to the processing in S1801 of FIG. 36 via terminal I, and the aforementioned processing is repeated. When it is determined in S3903 that the virtual router 209 that is a bottleneck has not been detected, the processing shifts to S4001 of FIG. 40 via terminal J.

Figure 40:
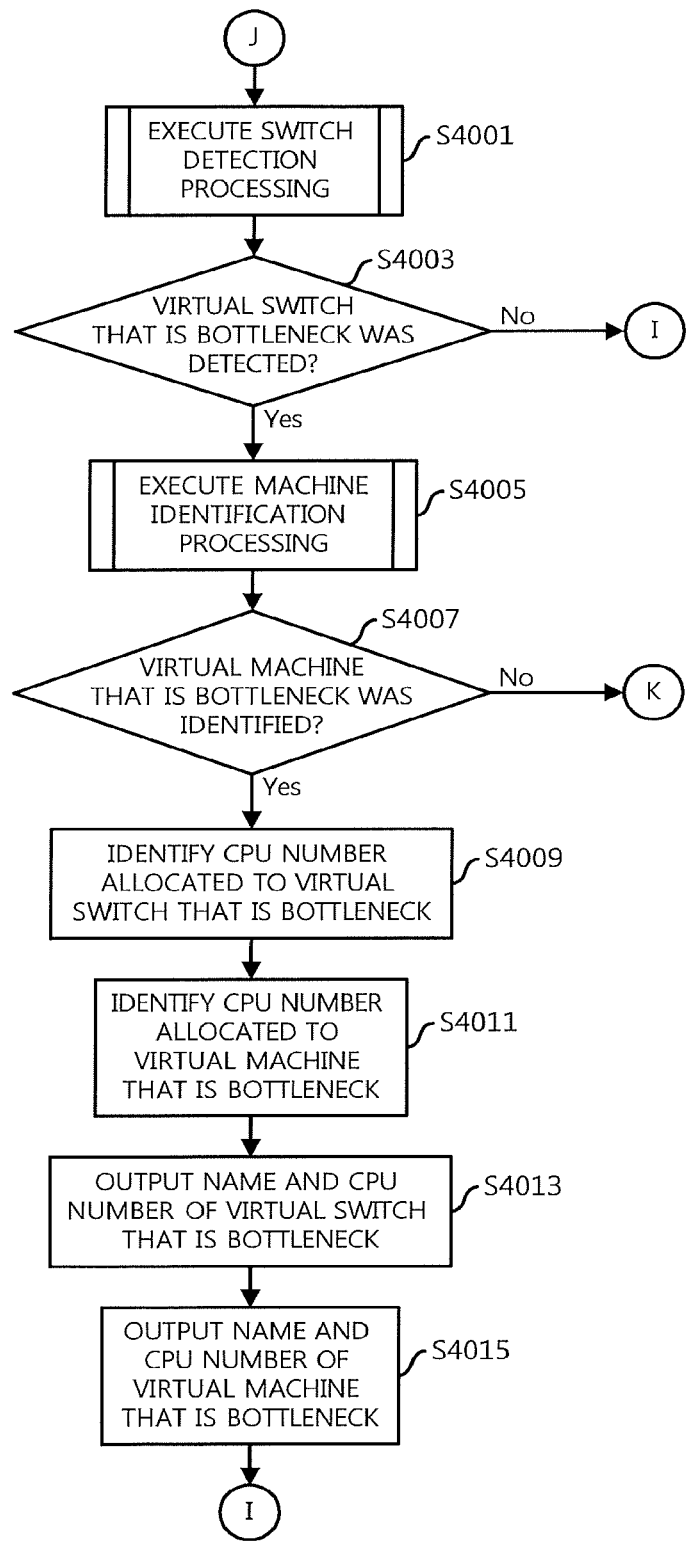
FIG. 40 is a diagram depicting a flow for the main processing (B)

Shifting to an explanation of FIG. 40, the processing of S4001 and S4003 is the same as in the case of S2309 and S2311 of FIG. 23. When it is determined in S4003 that the virtual switch 207 that is a bottleneck has not been detected, the processing returns to the processing in S1801 of FIG. 36 via terminal I and the aforementioned processing is repeated.

On the other hand, when the virtual switch 207 that is a bottleneck has been detected, the node identification unit 3403 executes machine identification processing (S4005). The node identification unit 3403 tries to identify, in the machine identification processing, a virtual machine program being executed in parallel by the CPU on which the virtual switch program relating to the bottleneck is being executed. The identified virtual machine 205 is a bottleneck.

Figure 41:
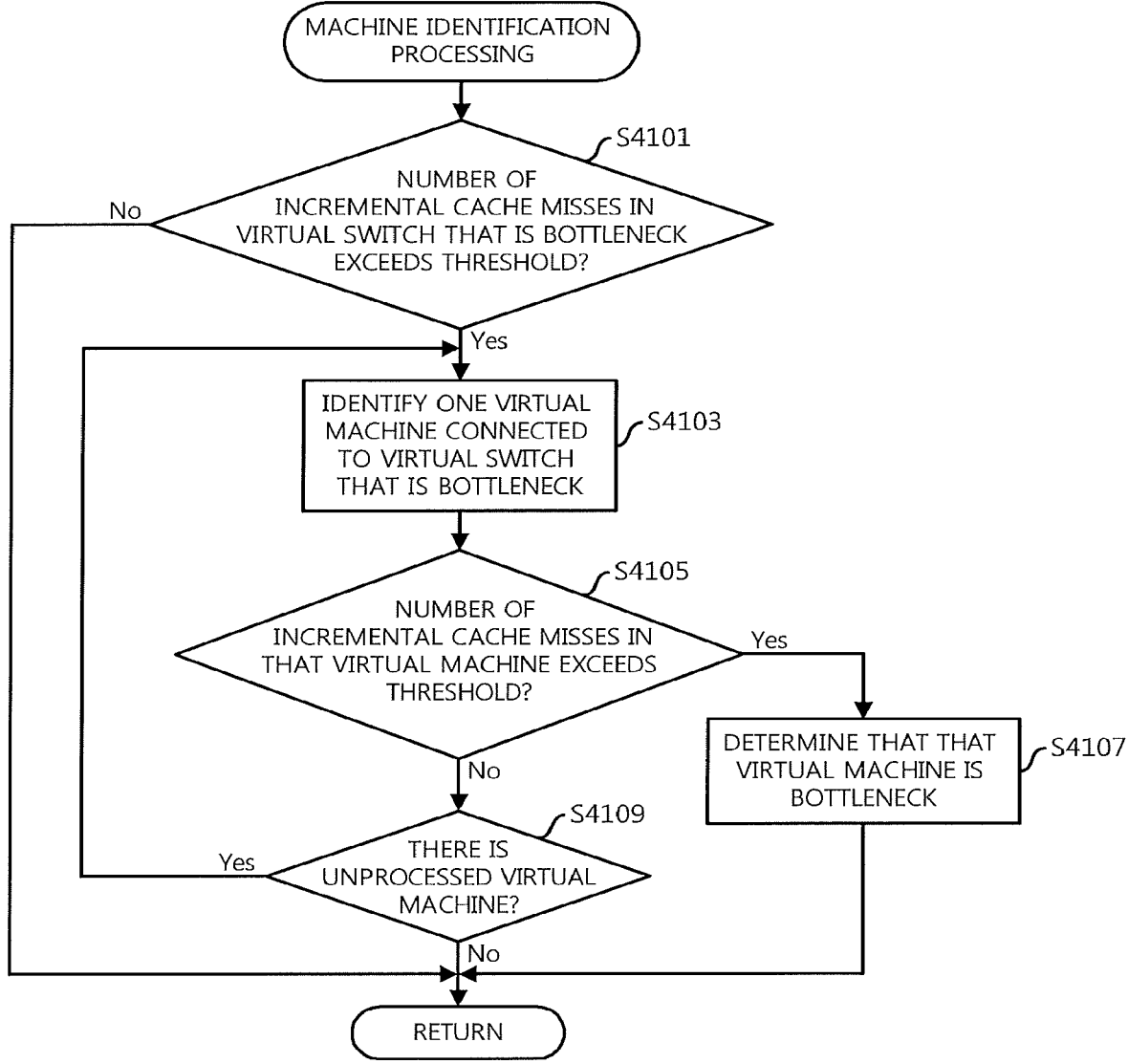
FIG. 41 is a diagram depicting a flow for machine identification processing.

FIG. 41 illustrates a flow for the machine identification processing. The node identification unit 3403 determines whether or not the number of incremental cache misses in the virtual switch 207 that is a bottleneck exceeds a threshold (S4101). When it is determined that the number of incremental cache misses does not exceed the threshold, the machine identification processing ends and the processing returns to the calling-source processing.

On the other hand, when it is determined that the number of incremental cache misses exceeds the threshold, the node identification unit 3403 identifies one virtual machine 205 that connects to the virtual switch 207 that is a bottleneck (S4103). Then, the node identification unit 3403 determines whether or not the number of incremental cache misses in the identified virtual machine 205 exceeds a threshold (S4105).

When it is determined that the number of incremental cache misses in the identified virtual machine 205 exceeds the threshold, the node identification unit 3403 determines that the identified virtual machine 205 is a bottleneck (S4107). Then, the processing returns to the calling-source processing.

On the other hand, when it is determined that the number of incremental cache misses in the identified virtual machine 205 does not exceed the threshold, the node identification unit 3403 determines whether or not there is an unprocessed virtual machine 205 (S4109). When it is determined that there is an unprocessed virtual machine 205, the processing returns to the processing in S4103 and the aforementioned processing is repeated.

On the other hand, when it is determined that there is no unprocessed virtual machine 205, there is no virtual machine 205 that is a bottleneck. In this case, the processing returns to the calling-source processing.

Returning to the explanation of FIG. 40, the virtual analysis apparatus 211 branches the processing depending on whether or not the virtual machine 205 that is a bottleneck has been identified in the machine identification processing (S4007).

When the virtual machine 205 that is a bottleneck has been identified, the CPU identification unit 1309 identifies a CPU number allocated to the virtual switch 207 that is a bottleneck (S4009). Furthermore, the CPU identification unit 1309 identifies a CPU number allocated to the virtual machine 205 that is a bottleneck (S4011). The output processing unit 1311 outputs a name and the CPU number of the virtual switch 207 that is a bottleneck (S4013). Furthermore, the output processing unit 1311 outputs a name and the CPU number of the virtual machine 205 that is a bottleneck (S4015). Then, the processing returns to the processing in S1801 of FIG. 36 via terminal I, and the aforementioned processing is repeated.

Figure 42:
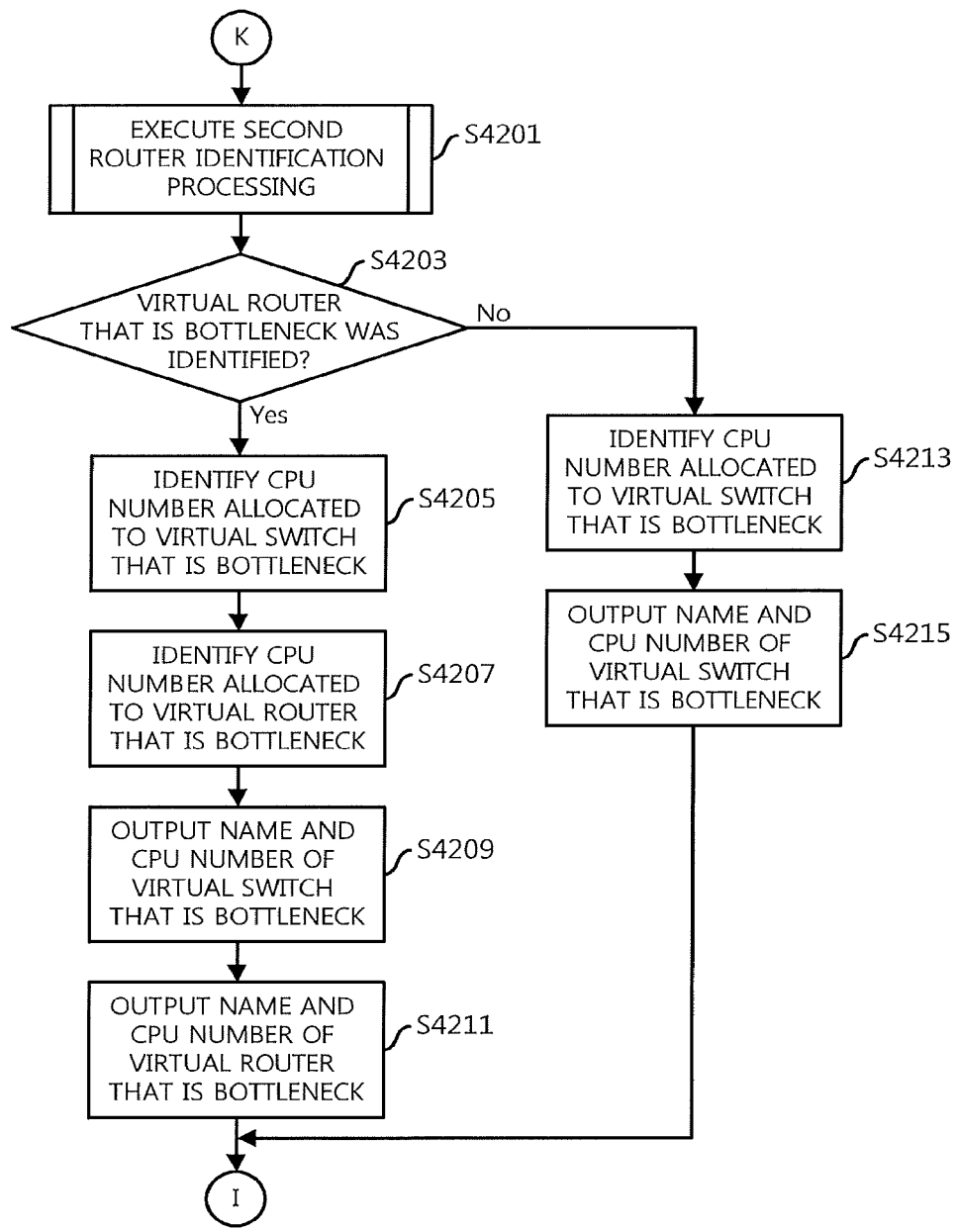
FIG. 42 is a diagram depicting a flow for the main processing (B)

On the other hand, when the virtual machine 205 that is a bottleneck has not been identified, the processing shifts to S4201 of FIG. 42 via terminal K.

Shifting to an explanation of FIG. 42, the node identification unit 3403 executes second router identification processing (S4201). In the second router identification processing, the node identification unit 3403 tries to identify a virtual router program being executed in parallel by the CPU on which the virtual switch program relating to the bottleneck is being executed. The identified virtual router 209 is a bottleneck.

Figure 43:
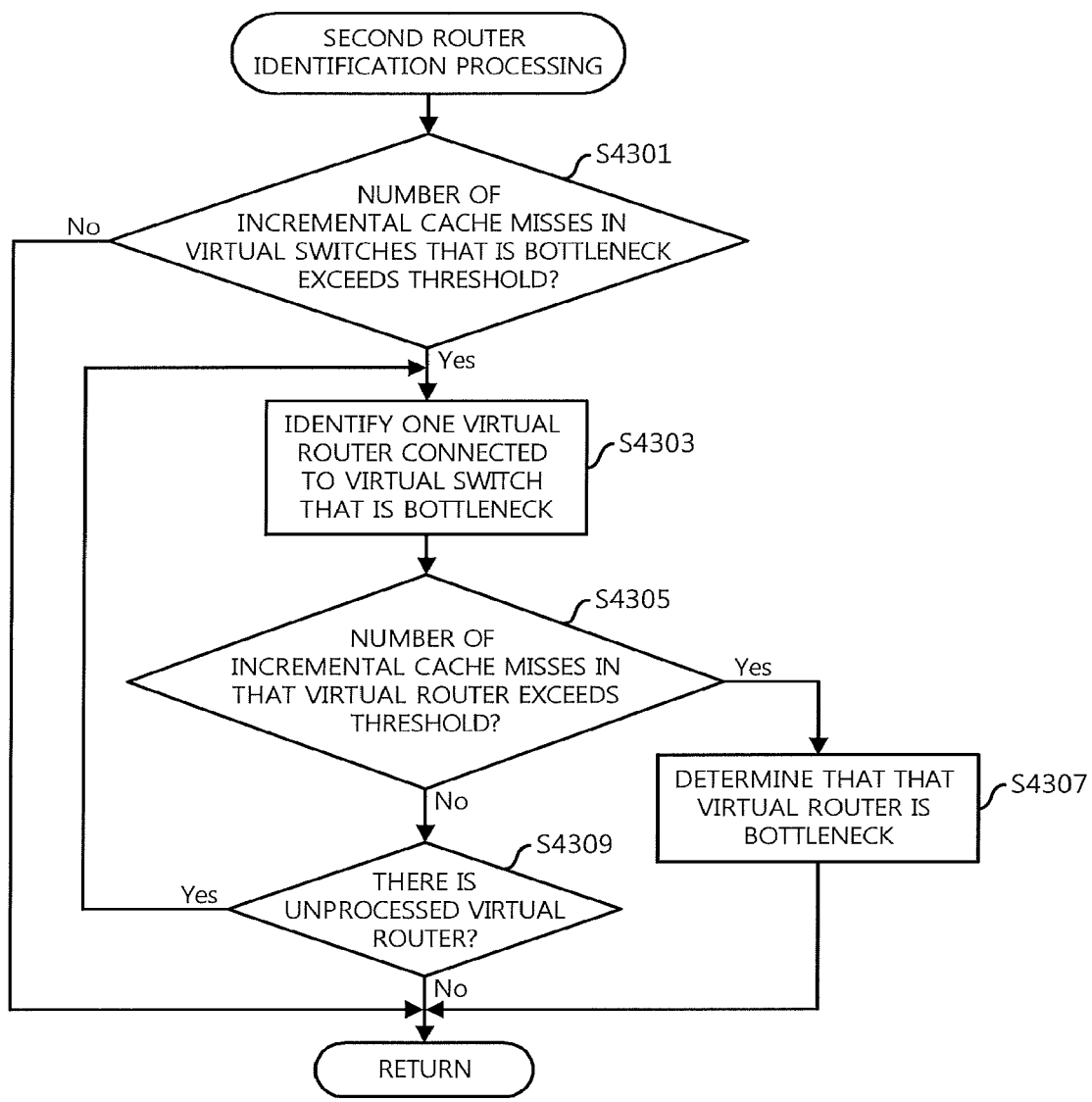
FIG. 43 is a diagram depicting a flow for second router identification processing.

FIG. 43 illustrates a flow for the second router identification processing. The node identification unit 3403 determines whether or not the number of incremental cache misses in the virtual switch 207 that is a bottleneck exceeds a threshold (S4301). When it is determined that the number of incremental cache misses does not exceed the threshold, the second router identification processing ends and the processing returns to the calling-source processing.

On the other hand, when it is determined that the number of incremental cache misses in the virtual switch 207 that is a bottleneck exceeds the threshold, the node identification unit 3403 identifies one virtual router 209 connected to the virtual switch 207 that is a bottleneck (S4303).

The node identification unit 3403 determines whether or not the number of incremental cache misses in the identified virtual router 209 exceeds a threshold (S4305). When it is determined that the number of incremental cache misses in the identified virtual router 209 exceeds the threshold, the node identification unit 3403 determines that the identified virtual router 209 is a bottleneck (S4307).

On the other hand, when it is determined that the number of incremental cache misses in the identified virtual router 209 does not exceed the threshold, the node identification unit 3403 determines whether or not there is an unprocessed virtual router 209 (S4309). When it is determined that there is an unprocessed virtual router 209, the processing returns to the processing in S4303 and the aforementioned processing is repeated.

On the other hand, when it is determined that there is no unprocessed virtual router 209, there is no virtual router 209 which is a bottleneck. In this case, the processing returns to the calling-source processing.

Returning to the explanation of FIG. 42, the virtual analysis apparatus 211 branches the processing depending on whether or not the virtual router 209 that is a bottleneck has been identified in the second router identification processing (S4203).

In the case of identifying the virtual router 209 that is a bottleneck, the CPU identification unit 1309 identifies a CPU number allocated to the virtual switch 207 that is a bottleneck (S4205). Furthermore, the CPU identification unit 1309 identifies a CPU number allocated to the virtual router 209 that is a bottleneck (S4207). The output processing unit 1311 outputs a name and the CPU number of the virtual switch 207 that is a bottleneck (S4209). Furthermore, the output processing unit 1311 outputs a name and the CPU number of the virtual router 209 that is a bottleneck (S4211). Then, the processing returns to the processing in S1801 of FIG. 36 via terminal I, and the aforementioned processing is repeated.

On the other hand, when the virtual router 209 that is a bottleneck has not been identified, the CPU identification unit 1309 identifies a CPU number allocated to the virtual switch 207 that is a bottleneck (S4213). The output processing unit 1311 outputs a name and the number of the virtual switch that is a bottleneck (S4215). Then, the processing returns to the processing in S1801 of FIG. 36 via terminal I, and the aforementioned processing is repeated.

According to this embodiment, it is easy to find another virtual node that is a bottleneck at the same time as the virtual node that was detected as a bottleneck.

In addition, it is easy to identify bottlenecks that synchronously occur due to stagnation of a CPU shared by plural virtual nodes.

[Embodiment 2]

In the embodiment described above, an example is explained in which virtual nodes that are bottlenecks simultaneously are identified based on the number of incremental cache misses. In this embodiment, an example will be explained in which virtual nodes that are bottlenecks simultaneously are identified based on a successive periods of packets.

Figure 44:
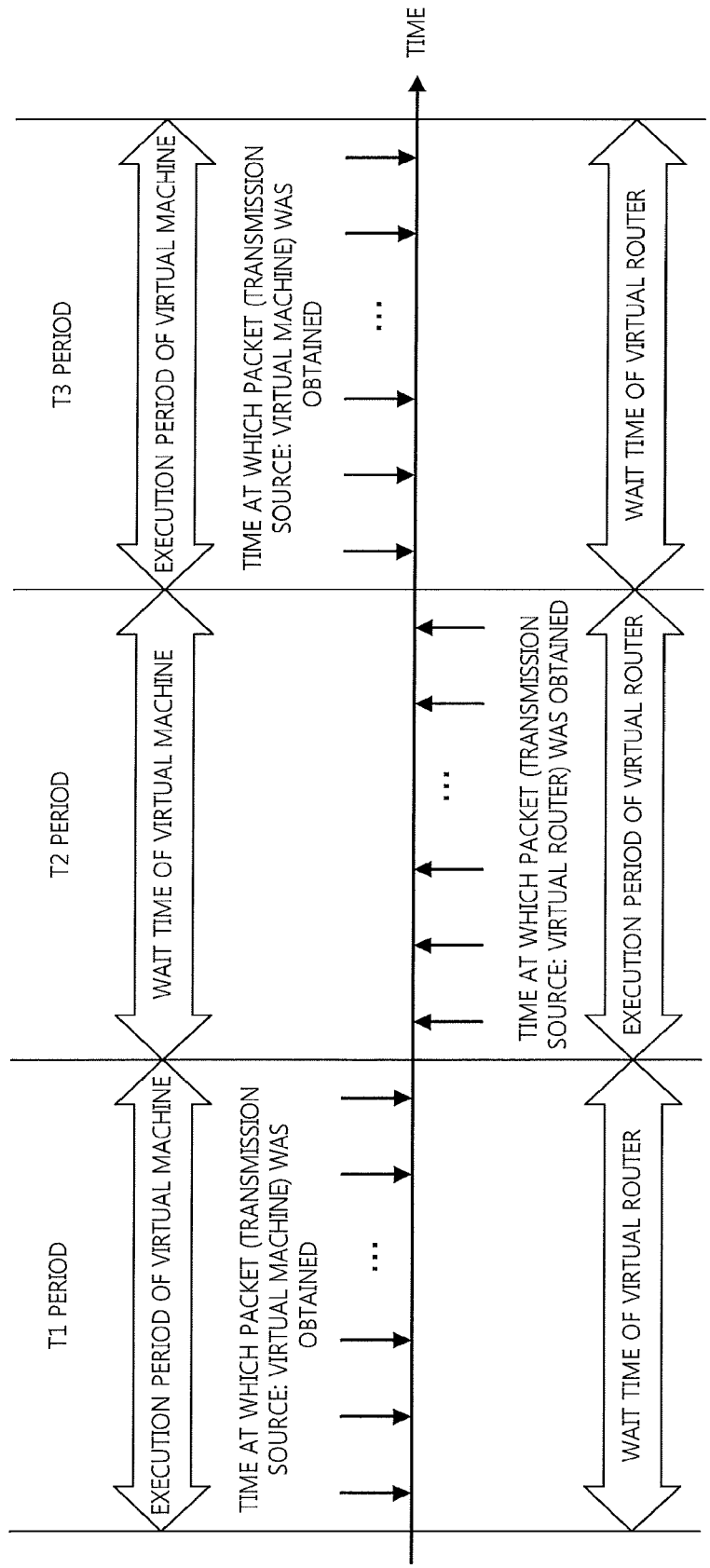
FIG. 44 is a diagram depicting execution periods of virtual node program.

In an example illustrated in FIG. 44, it is assumed that the virtual machine program and the virtual router program are executed in one CPU. The CPU switches execution programs (namely, processes) at predetermined intervals. In a T1 period, a process for the virtual machine 205 is executed, in a T2 period, a process the virtual router 209 is executed, and in a T3 period, a process for the virtual machine 205 is executed. Therefore, the process for the virtual router 209 waits in the T1 period and the T3 period. Moreover, the process for the virtual machine 205 waits in the T2 period.

At this time, if it is assumed that the virtual machine 205 continually transmits packets, the virtual analysis apparatus 211 continually obtains the packets in the T1 period. Moreover, when it is assumed that the virtual router 209 continually transmits packets, the virtual analysis apparatus 211 continually obtains the packets in the T2 period. The T3 period is the same as the T1 period.

In this way, length of a period during which packets whose source is the virtual machine 205 were continually obtained coincides with the switching interval of the execution programs executed by the CPU. Moreover, length of a period during which packets whose source is the virtual router 209 were continually obtained coincides with the switching interval of the execution programs executed by the CPU. Furthermore, both periods are alternately repeated. The virtual analysis apparatus 211 uses this characteristic to identify the virtual router 209 to which the same CPU as the virtual machine 205 is allocated.

Figure 45:
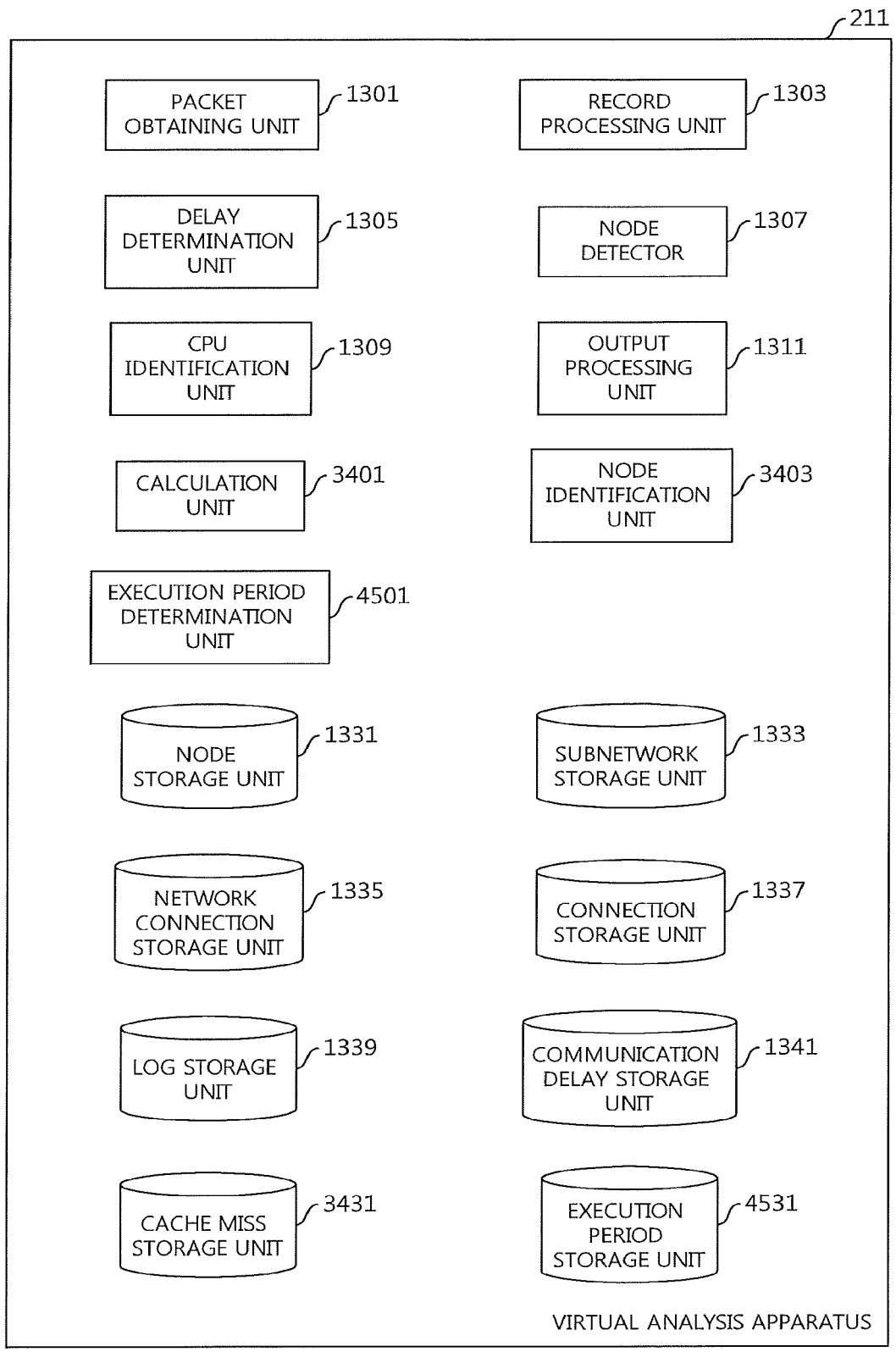
FIG. 45 is a diagram depicting an example of a module configuration of the virtual analysis apparatus in a second embodiment.

FIG. 45 illustrates an example of a module configuration of the virtual analysis apparatus 211 relating to the second embodiment. The virtual analysis apparatus 211 has an execution period determination unit 4501 in addition to the packet obtaining unit 1301 to the node identification unit 3403. The execution period determination unit 4501 determines a period during which a virtual node program is executed (hereinafter, referred to as the execution period). The execution period determination unit 4501 is realized by using hardware resources (for example, FIG. 50) and a program that causes a processor to execute processing described below.

Furthermore, the virtual analysis apparatus 211 has an execution period storage unit 4531 in addition to the node storage unit 1331 to the cache miss storage unit 3431. The execution period storage unit 4531 stores an execution period table. The execution period storage unit 4531 is realized by using hardware resources (for example, FIG. 50).

Figures 46, 47:
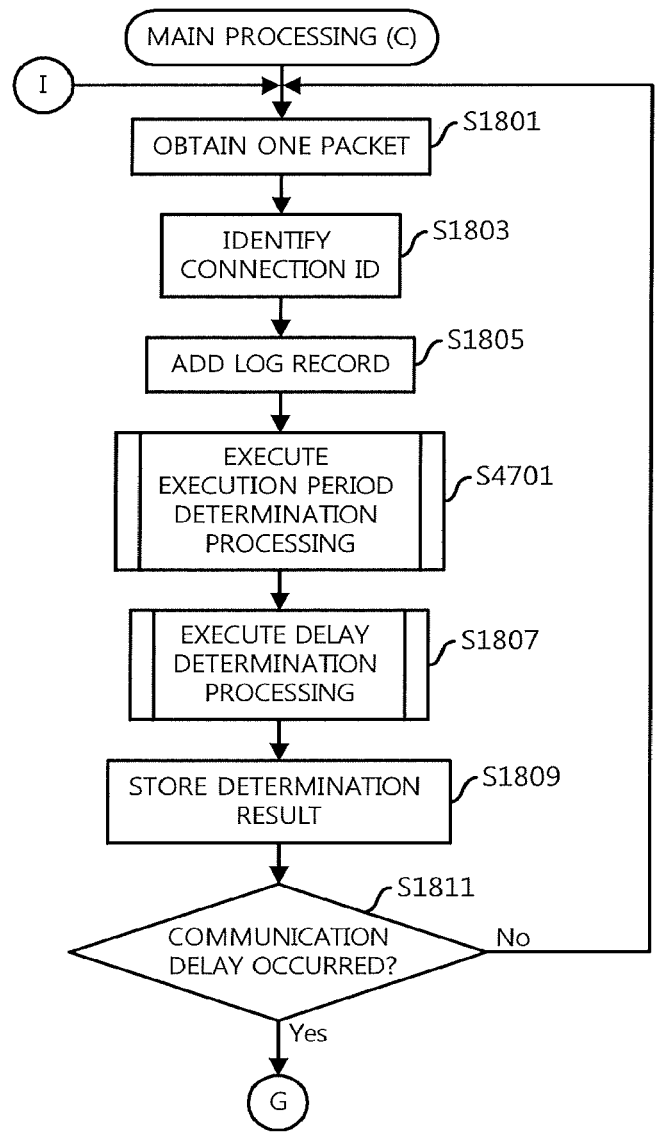
FIG. 46 is a diagram depicting an example of an execution period table.
FIG. 47 is a diagram depicting a flow for main processing (C)

FIG. 46 illustrates an example of the execution period table. The execution period table is provided for each virtual node. The execution period table in this example has a record corresponding to an execution period in a program of a virtual node. The record of the execution period table has a field in which a period ID is stored, a field in which a start time is stored, and a field in which an end time is stored.

The period ID identifies an execution period relating to the program of the virtual node. The start time identifies a beginning of the execution period. The end time identifies an end of the execution period.

In this embodiment, main processing (C) is executed. FIG. 47 illustrates a flow for the main process (C). The processing of S1801 to S1805 is the same as in the case of FIG. 18.

Upon completion of the processing of S1805, the execution period determination unit 4501 executes execution period determination processing (S4701). The execution period determination unit 4501 determines a period during which the CPU executes a program for realizing the virtual machine 205 corresponding to the source of the packet obtained in S1801 in the execution period determination processing.

Figure 48:
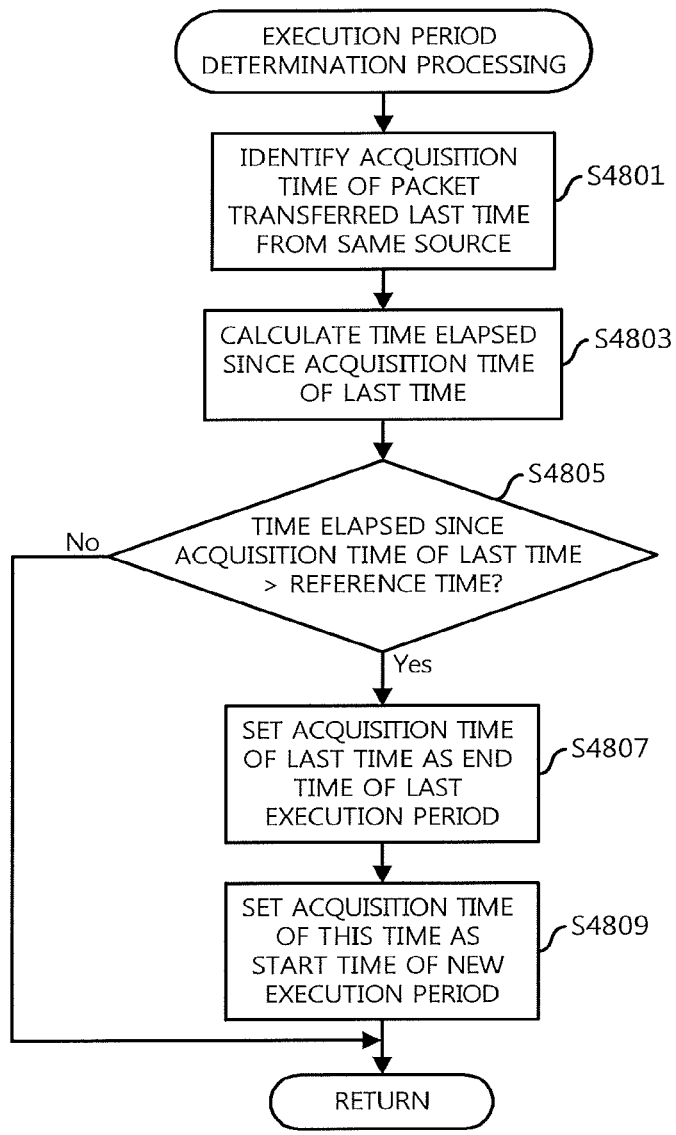
FIG. 48 is a diagram depicting a flow for execution period determination processing.

FIG. 48 illustrates a flow for the execution period determination processing. The execution period determination unit 4501 identifies an acquisition time of a packet transferred the last time from the same source as a source of the packet obtained in S1801 (S4801). The execution period determination unit 4501 calculates a time elapsed since the identified acquisition time of the last time (S4803). The execution period determination unit 4501 determines whether or not the time elapsed since the acquisition time of the last time is longer than a reference time (S4805). The reference time corresponds to an interval of obtaining continual packets.

When it is determined that the time elapsed since the acquisition time of the last time is not longer than the reference time, the processing returns to the calling-source processing.

When it is determined that the time elapsed since the acquisition time of the last time is longer than the reference time, the execution period determination unit 4501 sets the acquisition time of the last time as an end time of the last execution period (S4807). In addition, the execution period determination unit 4501 sets the time when the packet was obtained in S1801, in other words, the acquisition time of this time as a start time of the new execution period of FIG. 47 (S4809). Then, the processing returns to the calling-source processing.

Returning to the explanation of FIG. 47, the processing in S1807 and subsequent processing are almost the same as in the main processing (B). However, instead of the first router identification processing (A), the first router identification processing (B) is executed.

Figure 49:
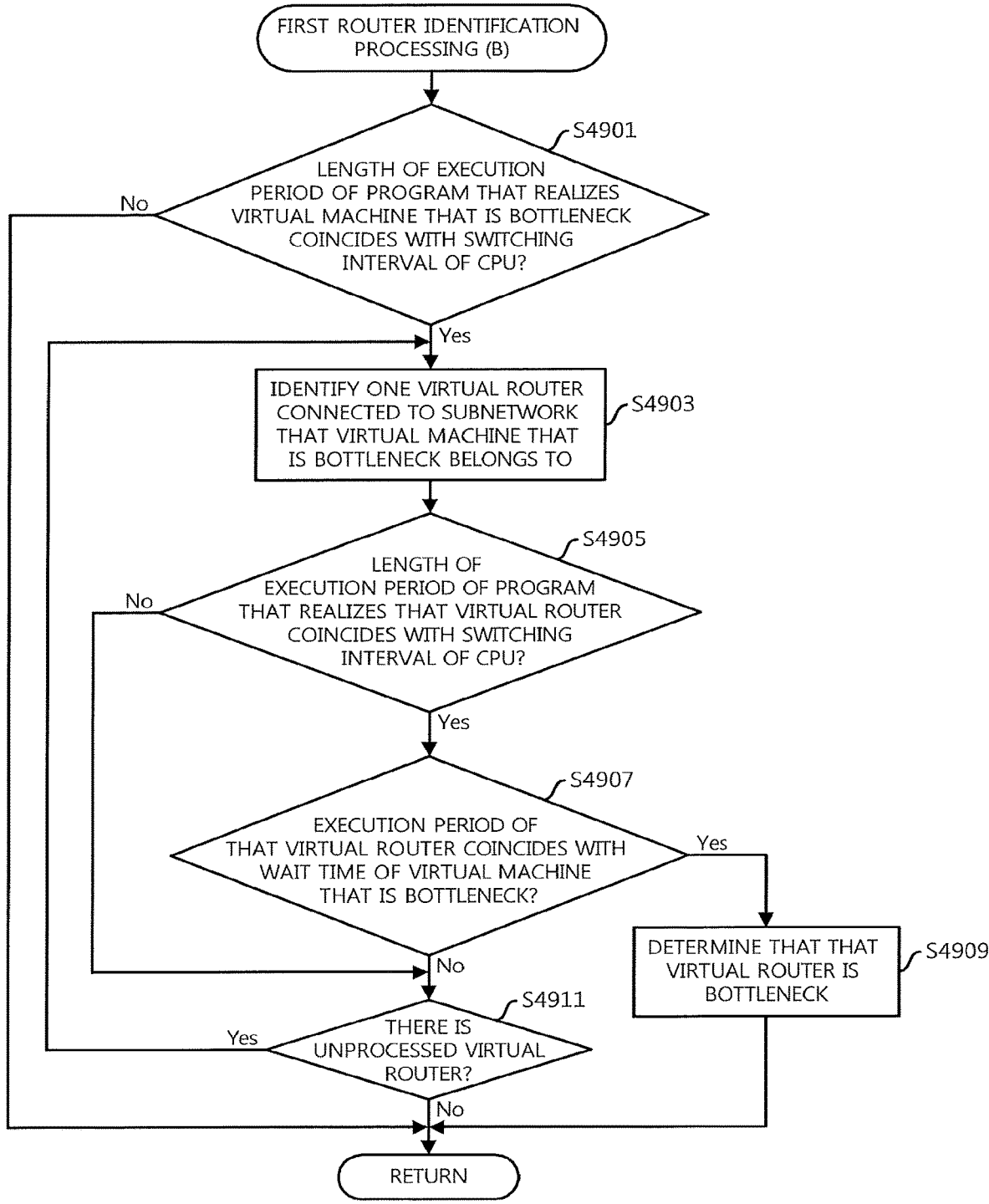
FIG. 49 is a diagram depicting a flow for first router identification processing (B)

FIG. 49 illustrates a flow for the first router identification processing (B). The node identification unit 3403 determines whether or not the length of the execution period of the program for realizing the virtual machine 205 that is a bottleneck coincides with the switching interval of the execution programs executed by the CPU (S4901).

When it is determined that the length of the execution period of the program for realizing the virtual machine 205 that is a bottleneck does not coincide with the switching interval of the execution programs executed by the CPU, there is no program that is being executed in parallel with the program of the virtual machine 205 that is a bottleneck. Accordingly, the first router identification processing (B) ends and the processing returns to the calling-source processing.

On the other hand, when it is determined that the length of the execution period of the virtual machine program coincides with the switching interval of the execution programs, the node identification unit 3403 identifies the virtual router 209 that connects to a subnetwork to which the virtual machine 205 that is a bottleneck belongs (S4903).

The node identification unit 3403 determines whether or not the length of the execution period of the program for realizing the virtual router 209 coincides with the switching interval of the execution programs executed by the CPU (S4905). When the length of the execution period of the virtual router program does not coincide with the switching interval of the execution programs, there is no program that is being executed in parallel with the program for realizing the identified virtual router 209. In this case, the processing shifts to S4911.

On the other hand, when the length of the execution period of the virtual router program coincides with the switching interval of the execution programs, the node identification unit 3403 determines whether or not the execution period of the virtual router program coincides with the wait time of the virtual machine 205 that is a bottleneck (S4907).

When the execution period of the virtual router program coincides with the wait time of the virtual machine program relating to the bottleneck, the node identification unit 3403 determines that the identified virtual router 209 is a bottleneck (S4909). Then, the first router identification processing (B) ends and the processing returns to the calling-source processing.

On the other hand, when the execution period of the virtual router program does not coincide with the wait time of the virtual machine program relating to the bottleneck, the program for realizing the identified virtual router 209 is being executed by a CPU different from a CPU for the program for realizing the virtual machine 205 that is a bottleneck. In this case, the processing shifts to S4911.

The node identification unit 3403 determines whether or not there is an unprocessed virtual router 209 (S4911). When it is determined that there is an unprocessed virtual router 209, the processing returns to the processing in S4903 and the aforementioned processing is repeated. On the other hand, when it is determined that there is no unprocessed virtual router 209, there is no virtual router 209 that is a bottleneck. In this case, the processing returns to the calling-source processing.

According to the embodiments, it is easy to find another virtual node that is a bottleneck at the same time as a virtual node detected as a bottleneck.

In addition, it is easy to identify bottlenecks that occur synchronously based on stagnation of processor shared by plural virtual nodes.

Although the embodiments of this invention were explained above, this invention is not limited to those. For example, the aforementioned functional block configuration does not always correspond to actual program module configuration.

Moreover, the aforementioned configuration of each storage area is a mere example, and may be changed. Furthermore, as for the processing flow, as long as the processing results do not change, the turns of the steps may be exchanged or the steps may be executed in parallel.

In addition, the aforementioned server apparatus 101 is a computer apparatus as illustrated in FIG. 50. That is, a memory 2501, plural CPUs (central processing unit) 2503 (2503a to 2503c in FIG. 50), a HDD (hard disk drive) 2505, a display controller 2507 connected to a display device 2509, a drive device 2513 for a removable disk 2511, an input unit 2515, and a communication controller 2517 for connection with a network are connected through a bus 2519 as illustrated in FIG. 50. An operating system (OS) and an application program for carrying out the foregoing processing in the embodiment, are stored in the HDD 2505, and when executed by any one of the CPUs 2503, they are read out from the HDD 2505 to the memory 2501. As the need arises, each CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In these embodiments of this invention, the application program to realize the aforementioned processing is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer apparatus as stated above, the hardware such as each CPU 2503 and the memory 2501, the OS and the application programs systematically cooperate with each other, so that various functions as described above in details are realized.

The aforementioned embodiments are summarized as follows.

An information processing apparatus relating to a first aspect of embodiments includes: a memory; a processor coupled to the memory and configured to: (A) detect a first virtual node that is a bottleneck from among plural of virtual nodes included in a virtual system; and (B) identify a second virtual node that is a bottleneck based on a first number of cache misses that occurred when a first program for realizing the first virtual node was executed and a second number of cache misses that occurred when a second program for realizing a second virtual node that is other than the first virtual node was executed.

In this way, it is easy to find plural bottlenecks that occurred simultaneously.

Furthermore, the first number of cache misses may be counted in a processor that executes the first program, and the second cache misses may be counted in a processor that executes the second program.

In this way, it is easy to identify bottlenecks that occur synchronously due to stagnation of a processor shared by plural virtual nodes.

Furthermore, the identifying may include (b1) identifying a third virtual node that is a bottleneck based on a first period during which packets whose transmission source is the first virtual node were transmitted continually and a second period during which packets whose transmission source is the second virtual node were transmitted continually.

In this way, it is easy to find plural bottlenecks that occurred simultaneously.

Furthermore, the identifying may include (b2) determining that the second virtual node is a bottleneck when the first period and the second period are alternately repeated.

In this way, it is easy to identify bottlenecks that occur synchronously due to stagnation of a processor shared by plural virtual nodes.

An analysis method relating to a second aspect of embodiments includes: (C) detecting a first virtual node that is a bottleneck from among plural virtual nodes included in a virtual system; and (D) identifying a second virtual node that is a bottleneck based on a first number of cache misses that occurred when a first program for realizing the first virtual node was executed and a second number of cache misses that occurred when a second program for realizing a second virtual node that is other than the first virtual node was executed.

Incidentally, it is possible to create a program causing an information processing apparatus to execute the aforementioned processing, and such a program is stored in a computer readable storage medium or storage device such as a flexible disk, CD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
a memory;
a processor coupled to the memory and configured to:
    detect a first virtual node that is a bottleneck from among a plurality of virtual nodes included in a virtual system; and
    identify a second virtual node, different from the first virtual node, as another bottleneck based on a first number of cache misses that occurred during execution of a first program for realizing the first virtual node and a second number of cache misses that occurred during execution of a second program for realizing the second virtual node.

2. The information processing apparatus as set forth in claim 1, wherein the first number of cache misses is counted in a processor that executes the first program, and the second cache misses is counted in a processor that executes the second program.

3. The information processing apparatus as set forth in claim 1, wherein the identifying comprises identifying a third virtual node that is a bottleneck based on a first period during which packets whose transmission source is the first virtual node were transmitted continually and a second period during which packets whose transmission source is the second virtual node were transmitted continually.

4. The information processing apparatus as set forth in claim 3, wherein the identifying comprises determining that the second virtual node is a bottleneck when the first period and the second period are alternately repeated.

5. A non-transitory computer-readable storage medium storing a program that causes a computer to execute a process, the process comprising:
detecting a first virtual node that is a bottleneck from among a plurality of virtual nodes included in a virtual system; and
identifying a second virtual node, different from the first virtual node, as another bottleneck based on a first number of cache misses that occurred during execution of a first program for realizing the first virtual node and a second number of cache misses that occurred during execution of a second program for realizing the second virtual node.

6. An analyzing method, comprising:
detecting, by using a computer, a first virtual node that is a bottleneck from among a plurality of virtual nodes included in a virtual system; and
identifying, by using the computer, a second virtual node, different from the first virtual node, as another bottleneck based on a first number of cache misses that occurred during execution of a first program for realizing the first virtual node and a second number of cache misses that occurred during execution of a second program for realizing the second virtual node.

* * * * *